March 7, 1961 A. M. SCHWEDA ET AL 2,973,730
MACHINES FOR AND METHODS OF PRODUCING
SEAMS AND PRODUCTS THEREOF
Filed June 2, 1954 18 Sheets-Sheet 17
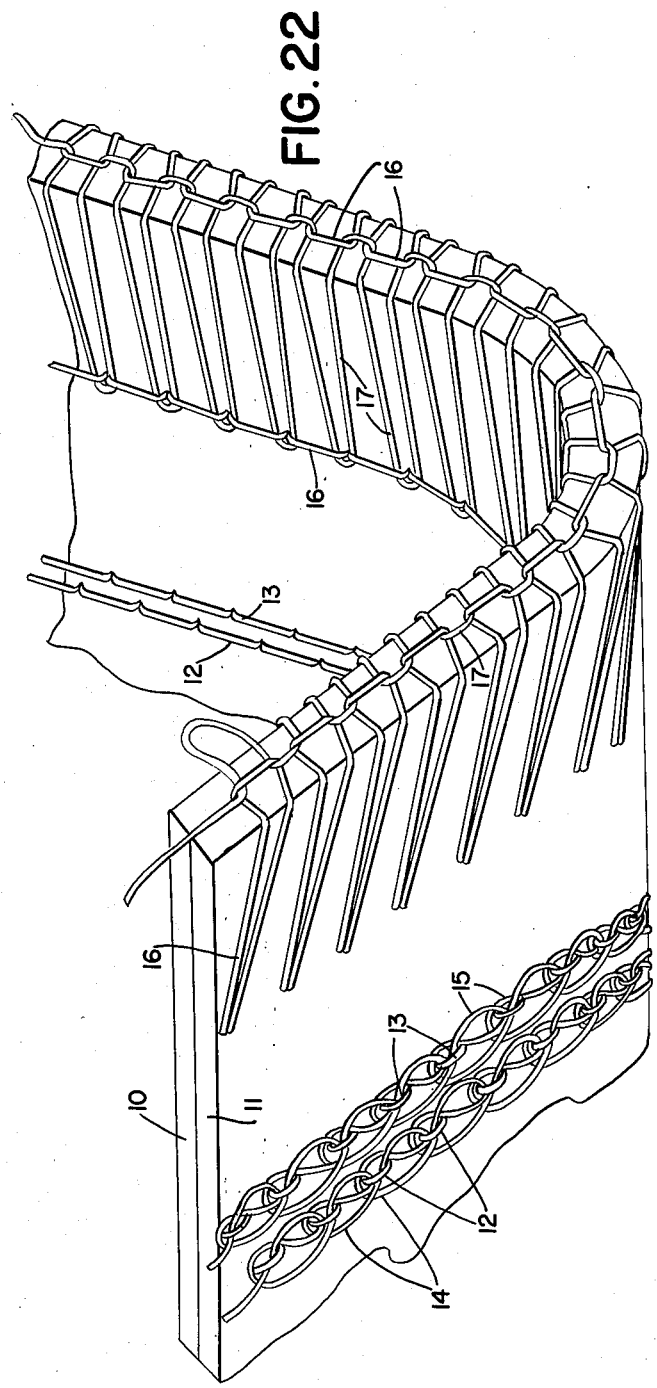
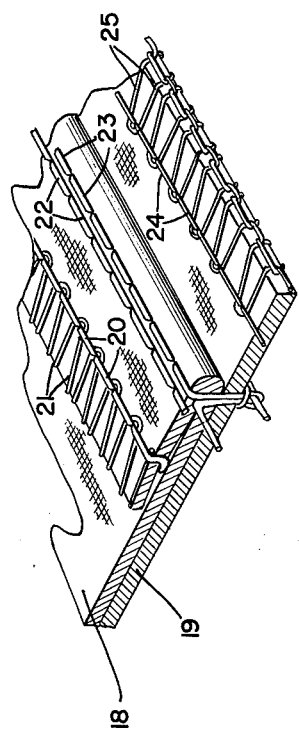

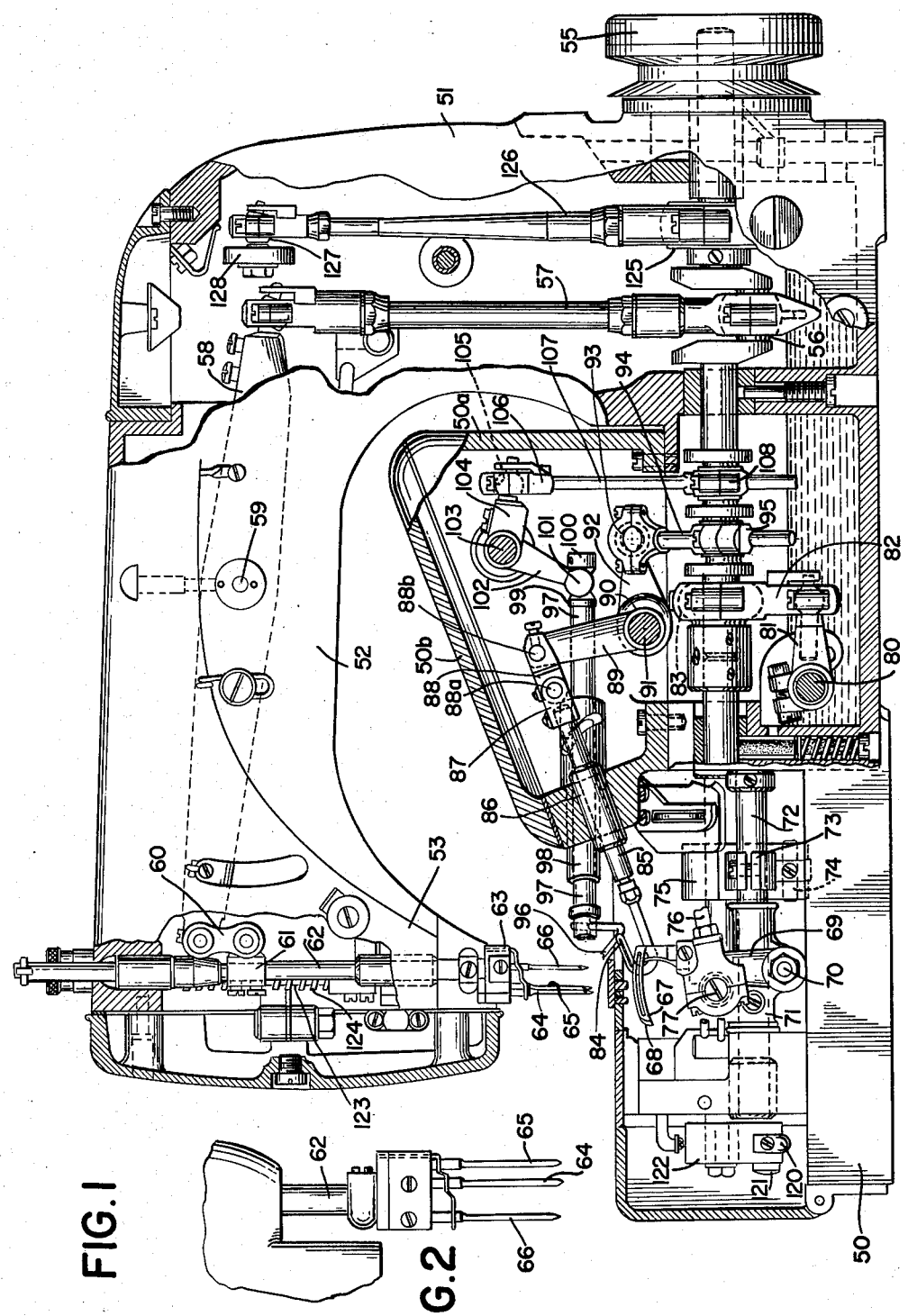

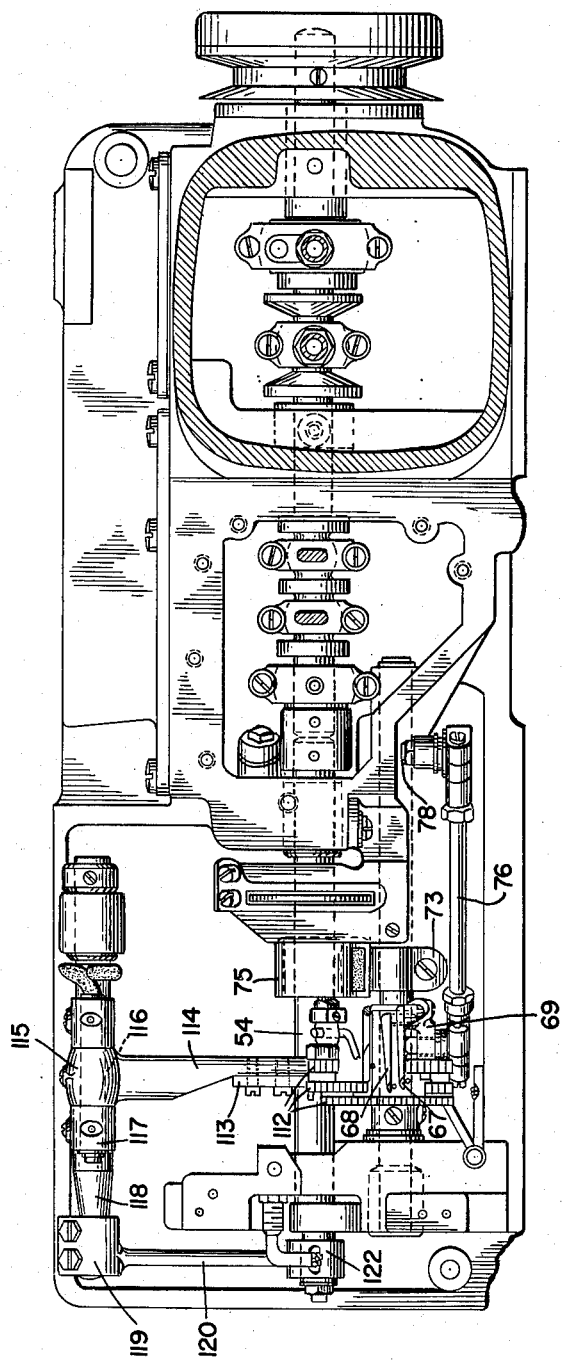

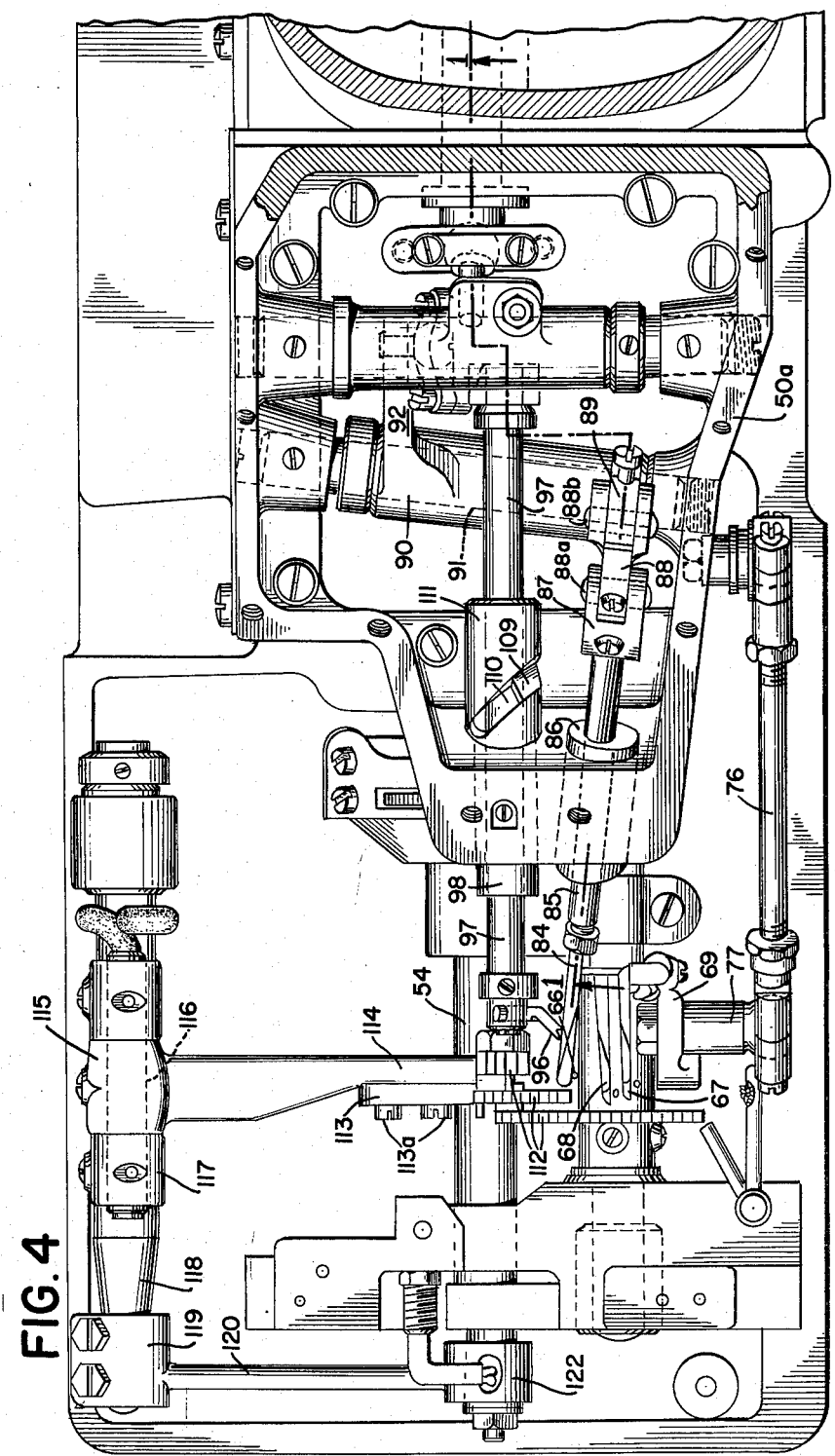

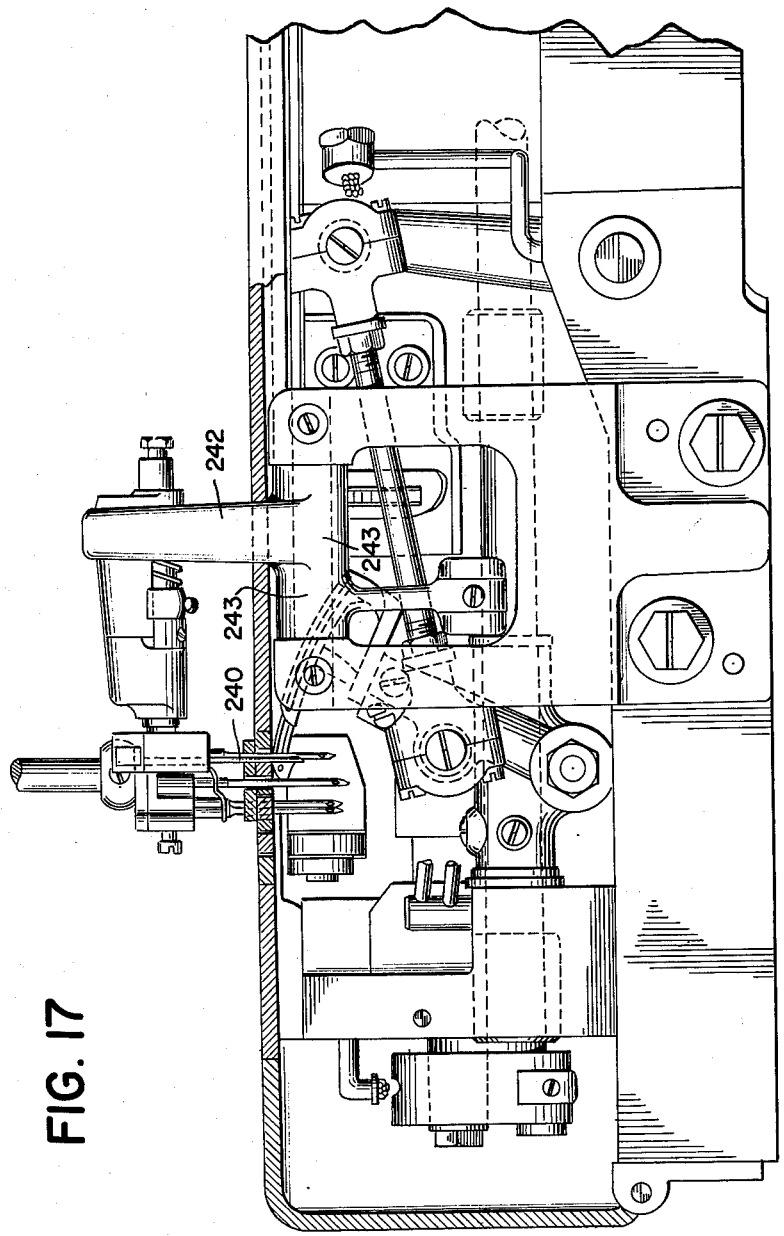

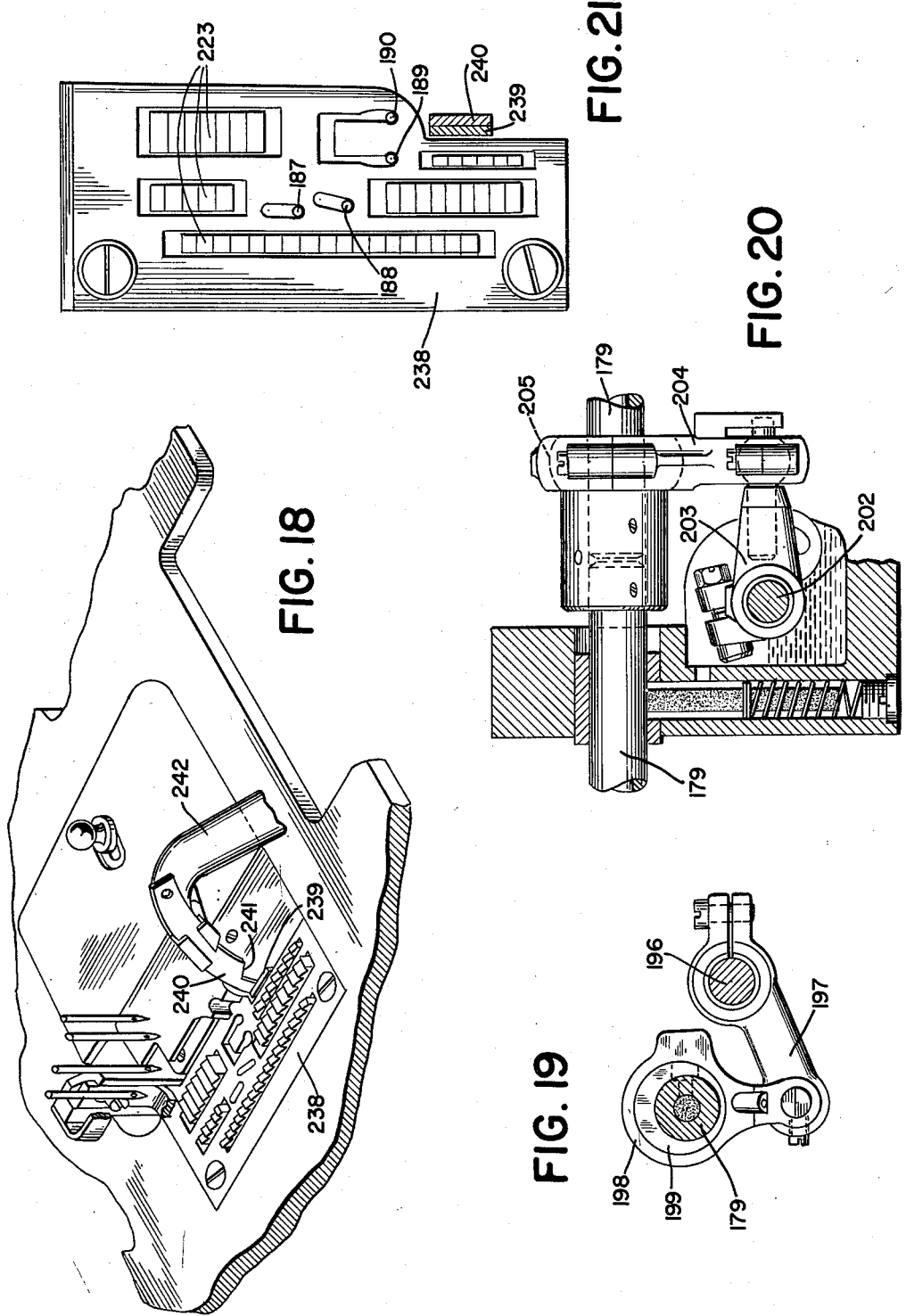

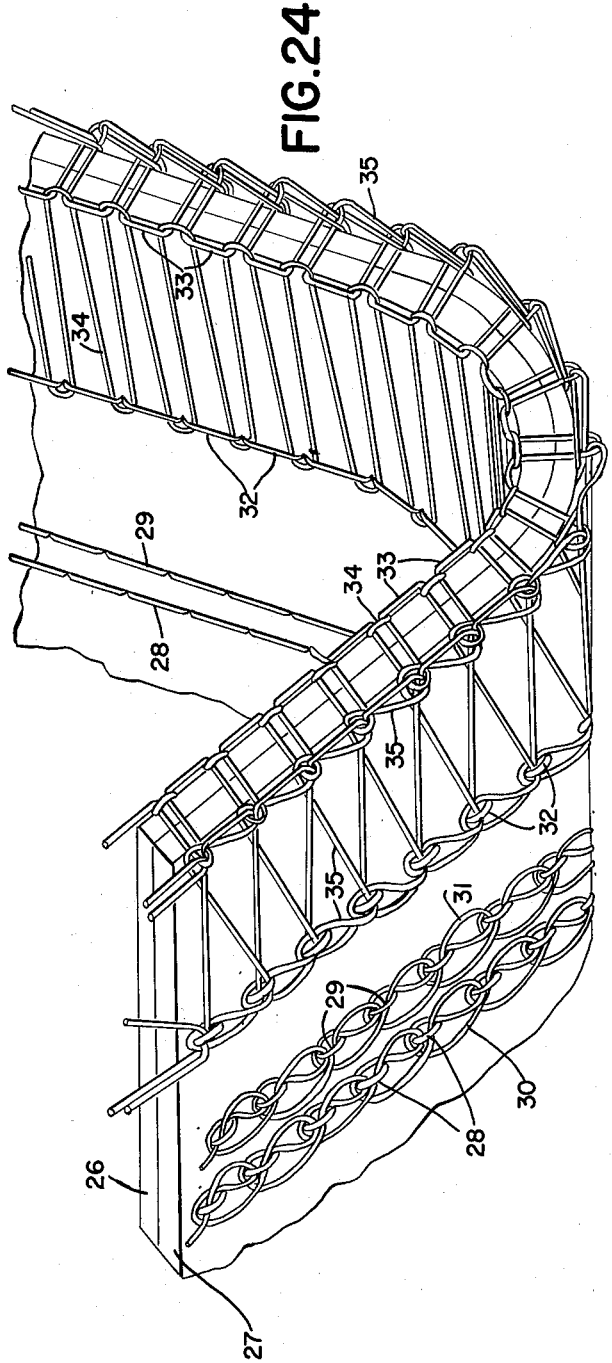
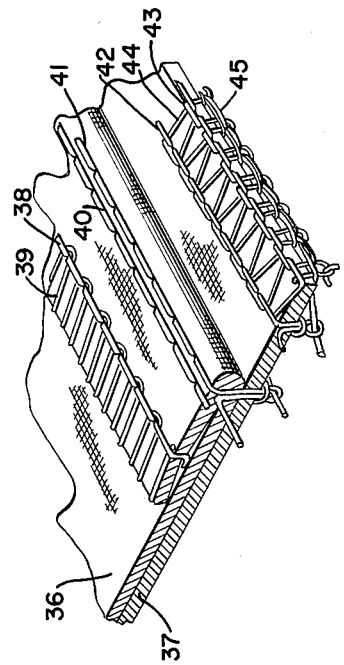

2,973,730
MACHINES FOR AND METHODS OF PRODUCING SEAMS AND PRODUCTS THEREOF

Albert M. Schweda, Chicago, and George V. Neill, Wheaton, Ill., assignors to Union Special Machine Company, Chicago, Ill., a corporation of Illinois Filed June 2, 1954, Ser. No. 433,937

17 Claims. (Cl. 112—162)

This invention relates to new seam constructions and to machines for and methods of producing the new seams. It relates particularly to the production of a new form of so-called "safety stitch" in items of clothing and the like which are subjected to hard usage and severe strain along the seams which unite a plurality of sections of fabric. However, the novel seam is not restricted to such uses.

The primary object of the invention is to provide a seam of the foregoing character which includes an overedge line of stitches extending over the free edge of one or more of the work sections and, in spaced relation thereto, a plurality of closely adjacent, through and through, straight lines of stitching of the two thread chain stitch type, designated 401 type stitches in the Federal Standard Stock Catalogue, Section IV (part 5), entitled, "Federal Specification for Stitches; Seams; and Stitching." In the preferred embodiment of the invention the overedge stitching is of the 503 type, so identified in said Federal Specification. This involves two sets of interlocked loops of two threads, one of which is passed through the work at periodic intervals, as by means of a needle, and the other of which is interlocked with the needle thread loops along the free edge of the work and at the top of the work. In lieu of the 503 type stitches, however, there may be provided a line of stitching of the 3-thread 504 type, or the 4-thread 602 type, or some other suitable form of overedge stitching. The plurality of lines of 401 type stitches have their needle thread loops arranged in staggered relation to each other so that when two such lines of stitches are provided the net effect is to form a seam having twice as many stitches to the inch as would be provided by a single line of such stitches. Moreover, the two lines of 401 type stitches are positioned so closely in relation to each other that they substantially function as, and present the appearance of a single line of stitching. Thus if the lines of 401 type stitches are each provided at 10 stitches to the inch there is produced the effect of a strong holding seam having 20 stitches to the inch, combined with a suitably spaced overedge line of stitching of 10 stitches to the inch. Since the overedge stitching is not subjected to the strain that is app'ied to the main through and through lines of 401 type stitches it is adequate to have the overedge stitches at 10 to the inch, or even less. A desired decorative and binding effect is provided by overedge stitches of such length. In fact, for certain types of work the stitch length for all of the lines of stitching may be such as to provide, say, 7 stitches to the inch. It will be understood, therefore, that the invention is not limited to the employment of any particular stitch length.

An advantage of the seam produced in accordance with the invention is that it may be formed at high speed and yet be provided with the desired strength and resistance to gapping. It is also economical in its use of thread. This is particularly true when the overedge stitching is of the 2-thread 503 type or the 3-thread 504 type. In the combination involving two lines of 401 stitching and an overedge line of stitches of the 503 type there are six threads involved. By providing the three lines of stitching at only half the number of stitches per inch required to produce the desired strength, a very substantial saving is effected in the length of the two threads forming the thread loops over the edge of the work. When an overedge stitch of the 504 type is provided a seventh thread is included in the seam, but the actual amount of thread utilized is not substantially different from that required in the 503 type of stitching.

When the seam is provided with a line of 602 type stitches, eight threads are employed in the entire seam and a somewhat greater amount of thread is required for the overedging than when either the 503 or the 504 type of stitching is employed. However, there is still a substantial saving in the total amount of thread required as against a seam of equal strength having only a single line of 401 type stitches which must in that event be shorter and be, for example, 14 to 20 stitches to the inch. In providing simultaneously 14 to 20 overedge stitches of the 602 type to the inch a substantially greater amount of thread is required than for the production of the seam of the invention.

In addition to the saving in thread, the employment of a 503 type stitch for overedging the free edge of one or more of the sections of the work has the advantage of providing a seam which presents a more uniform and attractive appearance. This is particularly true when two pieces are united in such a way as to provide two separate free edges each of which is bound by overedge stitching. Work of this character involves the production of an overedge line of stitching firstly over the free edge of one of the sections of the work, and then the simultaneous production of the two lines of 401 type stitches and the overedge stitching over the other free edge of the work. Customarily the binding and decorative line of stitching formed over the free edge of the first section is of the 503 type and, therefore, a neater effect in the seam as a whole is produced by the use of a similar 503 line of stitches over the free edge of the other section of the work.

The invention, in addition to contemplating the new seam constructions set forth above and a method of producing the seam, involves certain novel sewing machine constructions for simultaneously producing the two lines of closely adjacent 401 type stitches and the overedge line of stitches to produce the final desired effect in a rapid and economical manner.

With the foregoing and other objects, features, and advantages of the invention in view, certain preferred embodiments of the same will now be described in further detail in conjunction with the accompanying drawings, in which:

Fig. 1 is a view partly in elevation and partly in longitudinal section through a machine adapted to produce a seam in accordance with the invention, the upper part of the central sectioned portion being taken along the line 1—1 of Fig. 4 and portions of the frame being broken away;

Fig. 2 is a detail view of the needle carrying means, as viewed from the left in Fig. 1;

Fig. 3 is a view, partially in plan and partially in horizontal section, of the machine illustrated in Fig. 1, certain cover elements being removed;

Fig. 4 is an enlarged view, similar to Fig. 3, showing a portion of the machine as seen along a somewhat higher horizontal plane than Fig. 3;

Fig. 7a is a perspective view of a trimmer blade and its carrying means arranged to be mounted on a part shown in Fig. 7;

Fig. 17 is a view, partly in front elevation and partly in longitudinal, vertical section, of a portion of the base of the machine shown in Fig. 14;

Fig. 18 is a perspective view of a portion of the cloth plate and related parts of the machine shown in Fig. 14;

Fig. 19 is a detail view, showing in transverse vertical section a portion of the mechanism of the machine shown in Fig. 14;

Fig. 20 is a vertical sectional view through a portion of the mechanism of the machine shown in Fig. 14;

Fig. 21 is a plan view of the throat plate of the machine of Fig. 14 and certain related parts; and Figs. 22 to 25, inclusive, are perspective views showing new seams produced in accordance with the invention.

Figure 5:
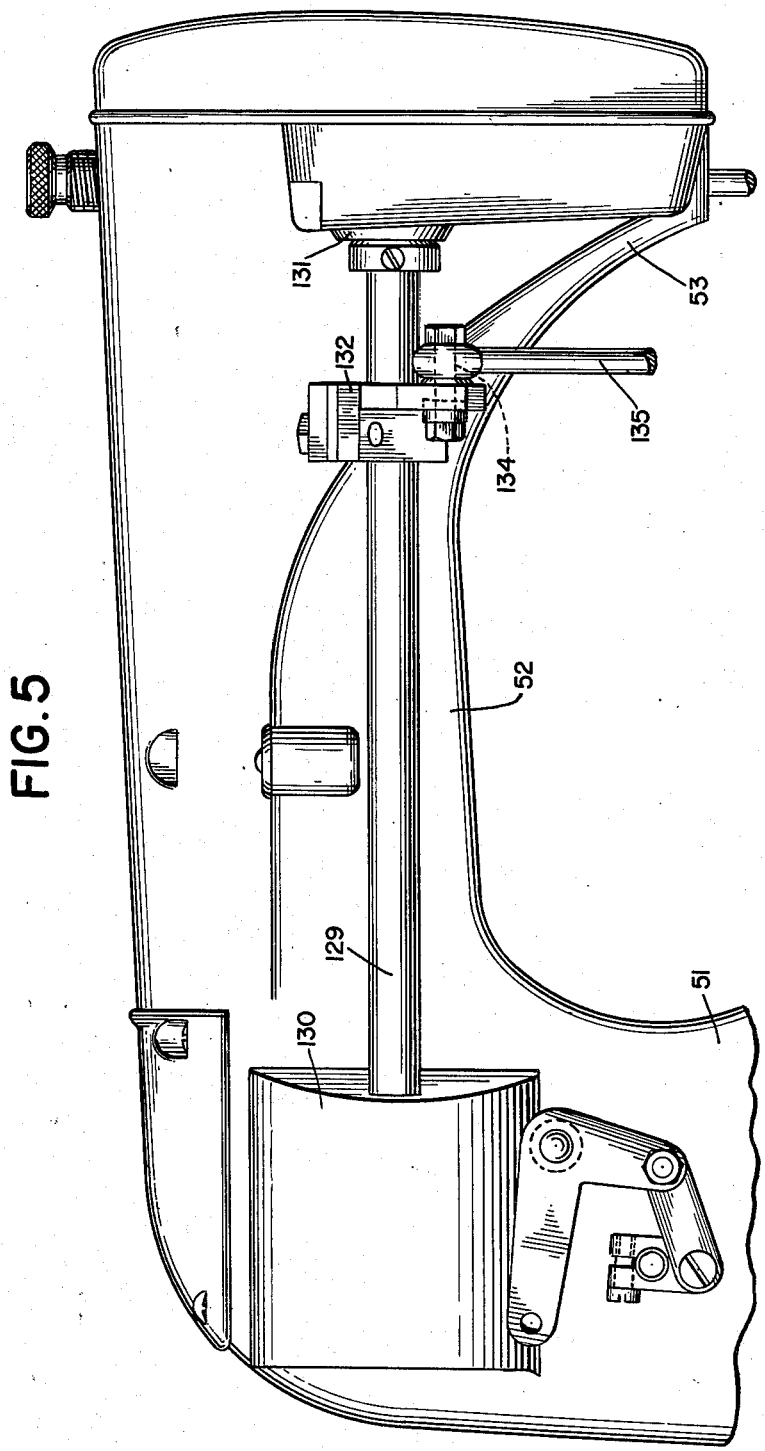
Fig. 5 is a rear elevational view of the upper portion of the machine.

To facilitate an understanding of the invention, several forms of seams produced in accordance with the invention will first be described. In Fig. 22 a preferred form of the new seam is shown. Two sections of work 10 and 11 are united by the new seam. This includes a pair of closely adjacent lines of 401 type stitches and a 503 type overedge line of stitches. The two lines of 401 type stitches are formed by needle threads 12 and 13 which are passed through the work sections at suitable intervals along a straight line at a suitable distance, say about ⅜ of an inch, inwardly of the free edge of the work. Each of these lines of stitching may be of any desired stitch length, depending upon the character of the work being performed. In the production of relatively coarse work these stitches may suitably be seven to the inch. For finer work they may suitably be 10 to the inch. Other stitch lengths may be employed if desired. It will be understood that Fig. 22 discloses the seam in a greatly magnified way, and the spacing of the two lines of 401 stitches is exaggerated to enable the illustration of the top and bottom formation thereof. As hereinabove indicated, these two lines of stitching are preferably formed so closely together that they present substantially the appearance of a single line of stitching.

This is particularly true of the under side, at which the various loops of the four threads involved are so interspersed as to make it impossible ot distinguish between the two lines with the naked eye. The two lines of needle thread loops 12 and 13 are staggered in relation to each other so that the points at which the two needle threads penetrate the work alternate throughout the length of the seam. On the under side of the work the loops of needle thread 12 are interlocked with a looper thread 14, in the manner shown, to provide a conventional two thread chain stitch. Similarly, the needle thread 13 forms loops at the under side of the work which are interlocked with a looper thread 15 to form a 401 type line of stitching.

Spaced a suitable distance from the two lines of 401 type stitches is an overedge line of stitches of the 503 type. This is formed, in part, by successive loops of needle thread 16 formed in a straight line along the upper face of the top section of the work, about midway between the lines of 401 stitches and the free edge of the work. On the under face of the lower section of the work the needle thread loops are drawn laterally toward the free edge of the two sections of the work and then upwardly across the free edge to about the median line between the two sections. Here each needle thread loop is interlocked with a looper thread 17 which extends upwardly the balance of the distance across the free edges of the work sections and then laterally over the top of the upper work section to the line of needle thread loops 16, where the looper thread becomes interlocked with the needle thread loops. The stitch length of the overedge line of stitches corresponds with that of the 401 type stitches. A neatly appearing firm union is thus provided between the two sections of work 10 and 11.

In Fig. 23 there is illustrated another new seam for uniting two sections of work 18 and 19. In the production of this seam an overedge line of stitches is first provided over the free edge of section 18. This is formed by a series of needle thread loops 20 and looper thread loops 21 which are disposed in the same manner as the threads 16 and 17 of Fig. 22. The work section 18 so provided, with an overedge line of stitching of the 503 type, is then placed upon the work section 19 in the position indicated in Fig. 23, with a fold in the section 18 along a line adjacent the two lines of 401 stitches to be formed, and a seam of the character described in relation to Fig. 22 is then formed. This seam comprises two lines of 401 type stitches produced by needle threads 22 and 23 and co-operating looper threads similar to the threads 14 and 15 of Fig. 22. These two closely adjacent lines of 401 stitches pass through the work section 18 near its folded edge. A line of overedge stitches of the 503 type is simultaneously formed over the free edge of the work section 19 by means of loops of needle thread 24 and looper thread 25, in the manner explained in relation to Fig. 22. The stitch length of the stitches in each of the 401 type lines and in the 503 type line are the same and the stitches in the 401 type lines are staggered in relation to each other, i.e. the needle loops in one line are midway between those in the other line. If more than two lines of 401 type stitches are provided, they will be staggered proportionally. After the 6-thread seam has thus been formed, the work section 19 is folded downwardly and outwardly toward the right along the left-hand line of 401 stitches to provide a seam of great strength and resistance to gapping with two free edges of the work sections bound by identical overedge lines of stitching.

As indicated hereinabove, the line of 503 type overedge stitches may be replaced, if desired, by a line of 3-thread overedge stitches of the 504 type. When this is done, the loops of needle thread 16 beneath the work will be relatively short and will have loops of underlooper thread passed through them toward the edge and upwardly across the edge of the work. A second, or overedge, looper thread then passes through the loops of the underlooper thread along the median line of the edge of the work and extends upwardly over the edge to the top and then laterally to the line of needle thread loops at the top of the work. In the construction illustrated in Fig. 23, one or both of the free edges of the work sections may be bound by such lines of stitches of the 504 type, instead of the 503 type shown.

Turning now to Fig. 24, there is illustrated a further modified form of the improved seam which embodies two closely adjacent and staggered lines of 401 stitches in combination with a line of stitches extending over the free edge of the work and inwardly along the top and bottom faces of the work in a manner generally similar to the form shown in Fig. 22. However, in its production two needle threads, a looper thread, and a cover thread are employed. The two lines of 401 stitches are formed by loops of needle thread 28 and 29 and interlocked loops of looper thread 30 and 31, in the same manner as explained in relation to Fig. 22. The overedge line of stitching is formed by loops of needle thread 32 which extend substantially continuously along a straight line at the top face of the work and which form spaced narrower loops 32 on the under face of the work, arranged in a similar straight line. A second needle thread 33 is formed into loops just at the free edge of the work, these loops being of substantially the same form as the loops of needle thread 32. Passed back and forth across the upper surface of the work is a cover thread 34 which is alternately interlocked with the loops of needle thread 32 and needle thread 33. On the under face of the work a looper thread 35 is passed in a complicated pattern in interlocked relation with the two needle threads 32 and 33. This line of stitches, formed by two needle threads, a cover thread, and a looper thread, is of the conventional 602 type.

In Fig. 25 a seam is shown which is similar to that shown in Fig. 23, with the exception that the overedge line of stitches formed by threads 24 and 25 of Fig. 23 is replaced by a 4-thread line of 602 type stitches. Thus briefly, the seam of Fig. 25 embodies an overedge line of stitching of the 503 type formed over the free edge of a work section 36 by loops of needle thread 38 interlocked with loops of looper thread 39. The section 36, with its free edge thus bound, is folded upon itself in the manner indicated and then placed over the section 37. The two sections are then united by two lines of 401 type stitches, indicated at 40 and 41. The free edge of the section 37 is simultaneously provided with a decorative and binding line of stitches of the 602 type formed by needle threads 42 and 43, cover thread 44, and looper thread 45, in the same manner as explained in connection with Fig. 24. It should be understood that after the improved seam has been applied to the two sections 36 and 37 in the manner explained, the section 37 will be folded downwardly and forwardly to present a strong, non-gapping seam formed by the closely spaced and staggered lines of 401 stitching. The overedge stitching applied to the free edges of each of the sections is simply, as indicated, for decorative and binding purposes.

Referring now to Figs. 1 to 9, inclusive, of the drawings, there is disclosed a sewing machine of special construction adapted to produce in one operation the type of seam illustrated in Fig. 22 and also that illustrated in Fig. 23, except for the formation of the overedge line of stitching at the free edge of the work section 18.

The new machine has a hollow frame providing a lubricant-tight enclosure for most of the main driving connections. It comprises a base 50 having a work supporting surface at its top, a vertical standard 51, and an overhanging arm 52 terminating in a needle head 53. Applied to the base portion 50 of the frame is an upwardly extending housing 50a of hood-like form, this being closed at its top by a cover member 50b. This hood-like extension serves to house certain of the operating mechanism and provides, in conjunction with a portion of the base proper, a lubricant-tight chamber. A main drive shaft 54 is suitably journaled in the base portion of the frame and extends through the lower portion of the vertical standard and outwardly through the right hand wall thereof (Fig. 1). Externally of the enclosed frame the shaft 54 carries a combined handwheel and pulley 55 through which power is supplied to the machine from an electric transmitter or the like.

Within the vertical standard, the shaft 54 is provided with a spherical crank element 56 with which is connected a pitman 57. The latter has strap elements at its opposite ends, the lower element having a spherical seat cooperating with the crank 56. The strap element at the upper end of pitman 57 is also provided with a spherical seat cooperating with a ball pin projecting from a needle lever 58. The latter is mounted to rock about a pivot 59 in the overhanging arm. At its opposite end, which extends into the needle head, the needle lever is connected by a link 60 with a block 61 secured to a vertically reciprocable needle bar 62. This bar is mounted for vertical movement within suitable bearing sleeves carried by the needle head. At its lower end, beneath the needle head, the bar 62 carries a needle clamp 63 arranged to support three needles 64, 65 and 66. As best shown in Figs. 1 and 2, the needles 64 and 65 are positioned in very nearly the same vertical plane parallel with the line of feed, i.e. extending from front to rear of the machine. In a suitable construction, the vertical planes specified, each containing one of the needles, are spaced apart about .0156 inch. In the direction from front to rear of the machine the needles 64 and 65 are spaced sufficiently to enable the needles to cooperate independently with loopers provided beneath the work support. The spacing of the needles in this direction is preferably either 1½ or 2½ times the stitch length, depending upon the stitch length to be produced by the machine. If the stitch length is such as to form seven stitches to the inch the spacing of the needles may be merely 1½ times the stitch length, while if the stitch length is such as to provide ten stitches to the inch it is desirable to space the needles at 2½ times the stitch length.

Cooperating with the needles 65 and 64 are two loopers 67 and 68, respectively, mounted upon a looper carrier 69 (Figs. 1, 3 and 4) rockably mounted on a bolt or stud 70 which projects forwardly from a sleeve 71 secured to a rock shaft 72. The latter has a rearwardly extending arm clamped thereto by means of a split sleeve or hub 73. Adjacent the rearward end of the arm there is pivotally connected with it, by means of a pin 74, a pitman having a strap portion 75 cooperating with an eccentric on the shaft 54. The arrangement is such that upon each revolution of the shaft 54 the rock shaft 72 will be oscillated to impart needle avoid movements to the looper carrier 69 and its loopers.

Loop seizing and shedding movements are imparted to the loopers by means of a link 76 provided at its left end (Fig. 1) with a strap having a spherical seat cooperating with a ball pin 77 extending forwardly from the looper carrier 69. The right end of link or pitman 76 carries a strap which cooperates with a pin 78 (Fig. 6), that extends forwardly from an arm 79 projecting upwardly from a rock shaft 80. This rock shaft, as shown in Fig. 1, has secured thereto an arm 81 which carries a ball pin cooperating with the spherical strap at the lower end of a pitman 82. This pitman has another spherical strap at its upper end cooperating with a spherical eccentric 83 secured to the shaft 54. It will be apparent that through the connections described, the desired loop seizing and shedding movements will be imparted to the loopers 67 and 68 to form, in conjunction with the needles 64 and 65, the two lines of closely adjacent 401 type stitches previously explained.

Cooperating with the needle 66, when its thread carrying eye is below the work support, is an underlooper 84 carried by a reciprocable rod 85 slidably mounted in a bearing sleeve 86. The axis of rod 85 is disposed in a vertical plane which is inclined at a small angle, about 10°, to a plane transverse to the line of feed from front to rear of the frame, as best shown in Fig. 4. This axis also is inclined at an angle of about 20° to the horizontal, as best shown in Fig. 1. At its upper end the rod 85 has secured thereto a block 87 which has pivotally connected therewith, by means of a pin 88a, a link 88 which is, in turn, pivotally connected, by means of a pin 88b, with the upper end of an arm 89 extending upwardly from a rock member 90 mounted on a fixed shaft 91, whose axis is inclined at a small angle to the direction of feed. It should be noted in this connection that the portion of Fig. 1 which passes through the hood 50a is along a plane at right angles to the shaft 91, while the section through the base of the frame is taken along a vertical plane through the axis of the shaft 54. The shaft 91 is mounted in suitable bosses provided in the front and rear walls of the hood 50a (Fig. 4). A laterally extending arm 92 carried by the rock member 90 has a forwardly projecting ball pin 93 which cooperates with the spherical seat of a strap carried by the upper end of a pitman 94. The lower end of this pitman has a strap 95 provided with a spherical seat cooperating with a spherical crank element carried by the drive shaft 54. The connections described are such that upon each revolution of the shaft 54 the thread carrying and seizing portion of looper 84 will be reciprocated along a line parallel with the axis of rod 85, and in the course of such reciprocation will pass a looper thread through the loop of needle thread carried by needle 66. The looper thread and needle thread will be carried upwardly and toward the right (Fig. 1) to a position in which the looper thread may be seized by an overedge element, such as a spreader, 96. This spreader could be replaced by a looper having a thread receiving and seizing portion similar to looper 84 if a three thread 504 type stitch is to be formed.

The means for supporting and operating the overedge element 96 are substantially the same as disclosed in the pending application of Wallenberg et al., Serial No. 196,104, filed November 17, 1950, now Patent No. 2,704,042, granted March 15, 1955. As best shown in Figs. 1 and 4, the element 96, which has a notch formed in its outer end adapted to seize the looper thread carried by the looper 84, is suitably mounted on a rod 97 adapted for both longitudinal reciprocation and oscillation about its axis. The rod 97 is carried by a bearing sleeve 98 extending through a wall of the hood 50a. It is so disposed that the axis of the rod is substantially in the plane of the work supporting surface of the frame or only slightly above the same. Adjacent its inner end the rod has a collar 99 formed thereon, and at its extreme inner end it has secured thereto a collar 100. Between these collars are mounted a pair of washers having central openings which are slightly elongated in a vertical direction to permit limited vertical movement thereof in relation to the rod. These washers have opposed faces of partial cylindrical contour arranged to cooperate with two spaced cylindrical end portions 101 of an arm 102 rockably mounted on a shaft 103. The two cylindrical end portions 101 straddle a reduced portion of the rod 97 and have bearing engagement with the cylindrical surfaces on the two washers mentioned. Connected with the arm 102, through a suitable rock sleeve mounted on the shaft 103, is a substantially horizontal arm 104 carrying a ball pin 105 at its outer end which is received by a strap 106 at the upper end of a pitman 107. The lower end of this pitman has a strap 108 cooperating with a spherical crank element carried by the shaft 54. Through the connections described, the rod 97 will be reciprocated axially within the bearing sleeve 98.

As best shown in Fig. 4, a radial projection 109 on the shaft 97 cooperates with a spirally arranged slot or opening 110 in an enlarged extension 111 of the bearing sleeve. This arrangement is such that as the rod 97 is reciprocated, it is also oscillated about its axis due to the camming action of the slot 110 on the projection 109.

As a result of the reciprocation and oscillation of the rod 97, the thread seizing end of the overedge element 96 will move along a spiral path and in the course of its active upward movement and shifting toward the left (Fig. 1) it will carry the looper thread from the looper 84 into the path of the needle 66 so that the latter, in its downward movement, may carry a loop of needle thread through the looper thread loop and cause the needle thread loop to become interlocked with the looper thread at the top face of the work. It will be understood that the driving cranks acting upon the needle bar, the underlooper, and the overedge element, are so coordinated in their action as to produce the 503 type stitch hereinabove described.

Figure 8:
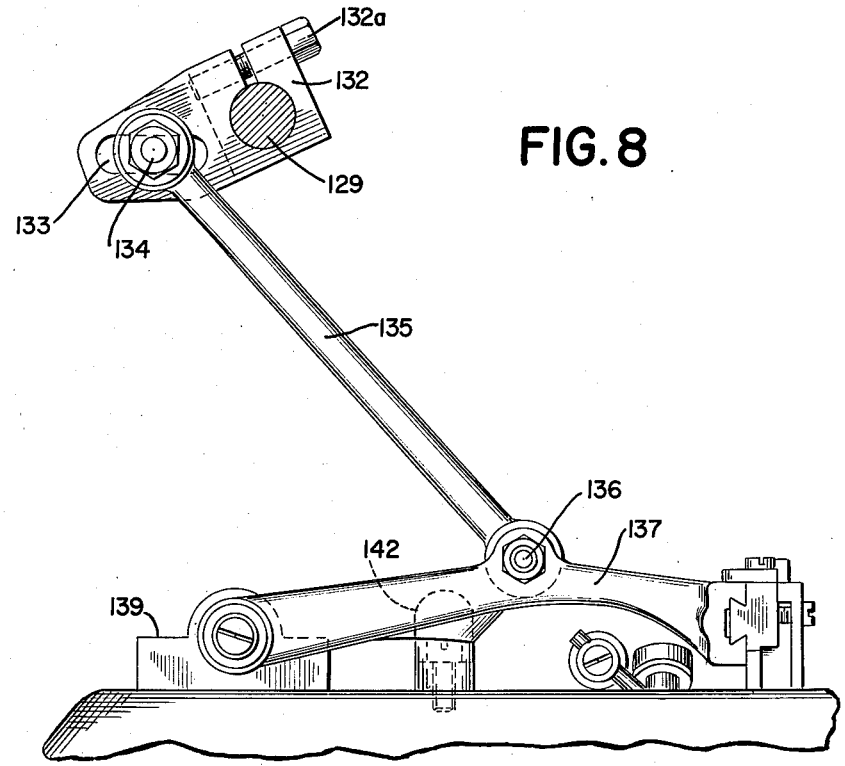
Fig. 8 is an enlarged, side elevational view of the trimmer mechanism and a portion of its driving connections.
Figure 9:
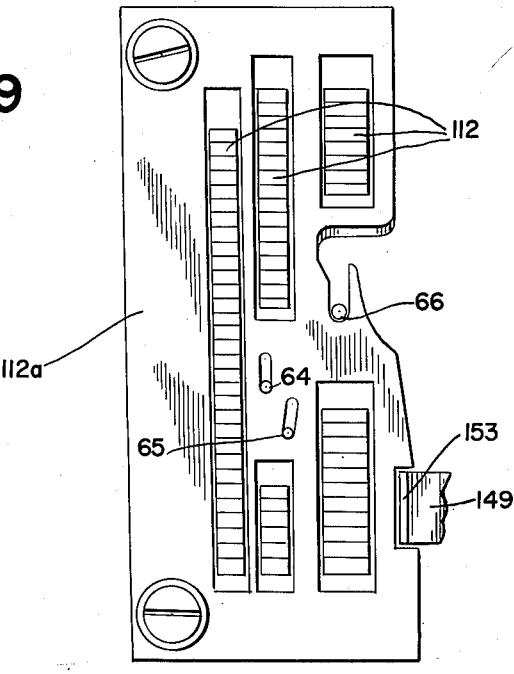
Fig. 9 is a plan view of the throat plate of the machine, and shows various associated parts in relation thereto.

For advancing the work in relation to the stitch forming elements, suitable feed mechanism is provided. That illustrated includes a feed dog 112 having a plurality of toothed sections arranged to be passed upwardly through suitable openings in a throat plate 112a (Fig. 9). The feed dog has a shank by means of which it may be mounted on an adjustable carrier 113 secured, through screws 113a (Fig. 4) to the forward end of a feed bar 114. A sleeve 115 formed at the rear end of the feed bar is rockably mounted by means of a shaft 116 on two spaced, upwardly extending portions of a feed rocker 117. A laterally extending element 118 carried by the feed rocker has clamped thereon a split collar 119 at the rearward end of an arm 120. At its forward end, this arm is pivotally connected by means of a pin 121 (Fig. 1) to the lower end of a pitman 122 cooperating with an eccentric adjacent the outer end of the shaft 54. This eccentric serves to impart feed and return movements to the feed dog through the connections described. Lifting and lowering movements are imparted to the feed dog by another eccentric disposed beneath the feed bar 114 and arranged to operate the latter through connections similar to those shown in Fig. 8 of the patent to Peterson et al., No. 2,577,430, granted December 4, 1951.

For the purpose of retaining the work yieldingly against the throat plate, and against the feed dog as the latter advances the work, there is provided a presser foot (not shown) which is mounted on the lower end of a presser bar 123 (Fig. 1) that is urged downwardly by a spring 124. The mounting and arrangement of this presser bar and its attached presser foot may be similar to that shown in the above mentioned Peterson et al. patent.

Figure 6:
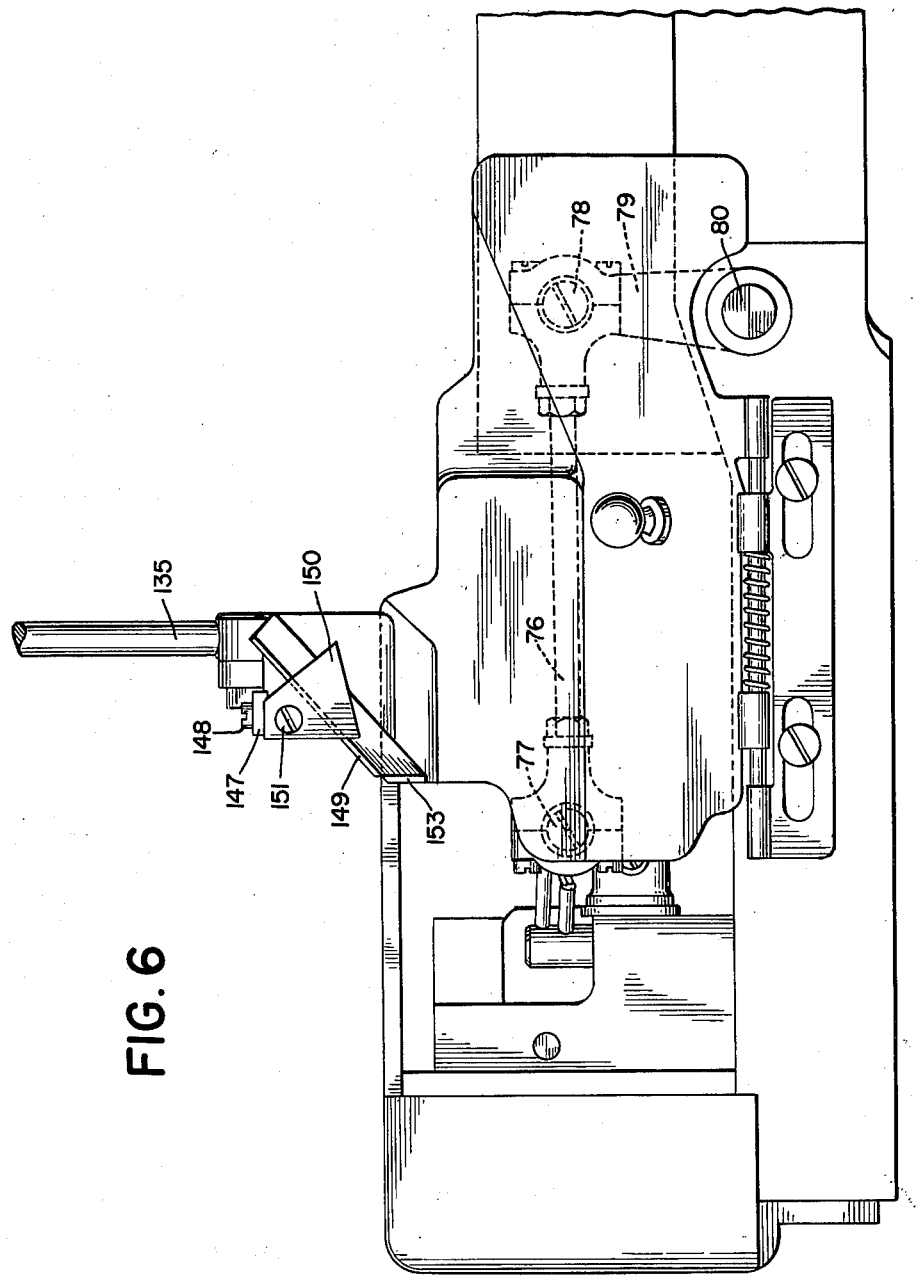
Fig. 6 is a front elevational view of a part of the lower portion of the machine with certain concealed parts being shown in dotted outline.
Figure 7:
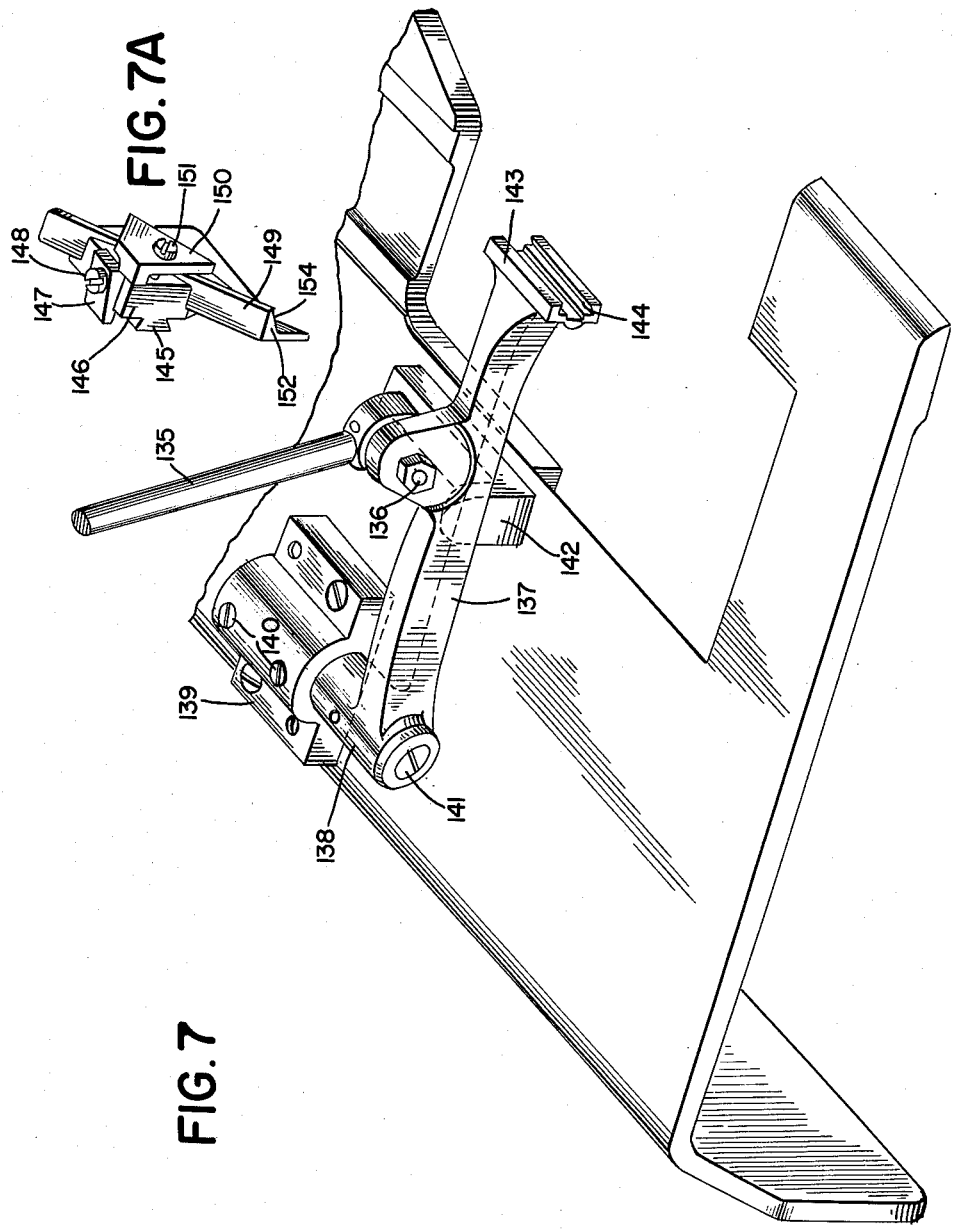
Fig. 7 is a perspective view of a portion of the cloth plate of the machine and a trimmer mechanism mounted thereon.

Means are provided for trimming the edge of the work to which the overedge line of stitching is to be applied. This insures the provision of an even edge along the proper line for the application of the overedge stitching. The trimmer and its operating means are shown in Figs. 1, 5, 6, 7, 7a, 8 and 9. For operating the trimmer a spherical eccentric 125 is provided on the shaft 54, and this cooperates with a strap, provided with a spherical seat, carried by the lower end of a pitman 126. The upper end of the latter is provided with a suitable strap having a spherical seat cooperating with a ball pin 127 secured to the forward end of an arm 128 (Fig. 1). That arm is secured, in a manner not shown, to a shaft 129 (Fig. 5) which extends along the rear face of the upper arm of the frame. A rearward projection 130 at the top of the vertical standard houses and provides a bearing for the left end of the shaft 129. At its opposite end, the shaft 129 is journalled in a bearing sleeve carried by a boss 131 formed on the needle head. At an intermediate point a block 132 is secured to the shaft 129, this block being clamped to the shaft by a screw 132a (Fig. 8). The block 132 has a rearwardly extending portion provided with an arcuate slot 133 arranged to receive a pivot bolt 134. This may be clamped in any position along the slot 133 to provide adjustment of the trimming stroke. A link 135 has a hub portion pivotally mounted on the bolt 134 and another hub portion at its opposite end pivotally mounted on a bolt 136 carried by a rock member 137. The later, as best shown in Fig. 7, has an elongated hub portion at its rearward end which is rockably mounted on a stud carried by a block 139 secured to the cloth plate of the machine. Suitable means, such as screws 140, serve to retain the stud in the block. A screw 141 holds the hub 138 on the projecting portion of the stud and permits rocking movement of the member 137. A guide element 142, secured to the cloth plate, engages the far side face (Fig. 7) of the member 137 to retain it against movement in that direction in the course of a trimming operation. At its forward end the member 137 is provided with an elongated, laterally extending channel portion 143 having a groove 144 arranged to receive a tongue 145 extending rearwardly from a block 146 (Fig. 7a). The block may be adjusted longitudinally of the channel 143 and may then be locked in set position by a wedge-like element 147 having a projecting portion arranged to cooperate with the top face of the channel portion 143. A screw 148 serves to retain the parts in set position. A knife element 149, of angle form in cross-section, is retained by the block 146 in a downwardly inclined position, as best shown in Fig. 7a. It is retained in set position on the block by means of a plate 150 secured to the block by a screw 151. The lower end 152 of the knife element 149 is disposed vertically and arranged to cooperate with a stationary knife element 153 (Fig. 6). It will be understood that as the movable knife blade 149 is moved downwardly, an inclined cutting edge 154 on the latter will serve to trim off a small section of the edge of the work in conjunction with the knife edge of the fixed blade 153. This takes place along the desired line, parallel with the line of feed, at the desired spacing from the lines of 401 type stitches and the line of needle thread loops 16 (Fig. 22) formed along a straight line at the top of the work.

It will be understood that the machine is equipped with other devices or attachments incidental to the proper functioning of the machine. These include, for example, suitable presser bar lifting devices, to facilitate introduction of the work, and suitable thread handling and take up devices, which are only partially shown. Since they form no part of the subject matter to be claimed herein it is believed unnecessary to describe them or to illustrate them in further detail.

Suitable means are also provided for lubricating the various wear receiving surfaces of the machanism within the machine. The means provided for this purpose likewise forms no part of the invention to be claimed herein, and therefore it is believed to be unnecessary to describe the same in detail. Suffice it to say that two intercommunicating lubricant reservoirs are provided at the base of the vertical standard and in the chamber below the hod 50a. Various portions of the operating parts dip into the lubricant in these reservoirs to create a lubricant mist in the enclosed portions of the frame above them. Wicking also serves to deliver lubricant from the reservoirs to certain operating connections outside of the fully enclosed portions of the frame.

Turning now to Figs. 10 to 13, inclusive, there is shown a modified arrangement of the looper and overedge element and the operating means therefor. In other respects the machine illustrated in Figs. 10 to 13, inclusive, is substantially the same as the machine above described. Thus a needle bar 62 is provided, which carries at its lower end, and serves to reciprocate, three needles 64, 65, and 66. A pair of loopers 67 and 68 cooperate with needles 65 and 64 respectively to form the two closely adjacent lines of 401 stitches. A looper 155 cooperates with the needle 66 when the thread carrying eye of the latter is beneath the work support. Looper 155 is carried by a reciprocable rod 156 slidably mounted in a bearing sleeve 157. The axis of the rod 156 is contained within a vertical plane which is disposed at right angles to the line of feed of the work being stitched. In this respect it differs from the rod 85 of the first embodiment, which, as explained, is angled outwardly from a vertical plane of the character mentioned. At its upper end the rod 156 has secured thereto a block 158, to which is pivotally connected an arm 159. The opposite end of this arm is pivotally connected with the upper end of an arm 160 which extends upwardly from a rock member 160a mounted on a fixed shaft 161 (Figs. 10 and 11) carried by inwardly extending bosses on the hood 50a. The rock member has a rearwardly extending arm 162 carrying a ball pin 163 adjacent its outer end which is received by a strap, provided with a spherical seat, at the upper end of a pitman 164. The lower end of this pitman has another strap provided with a spherical seat cooperating with a spherical crank element on the shaft 54. It should be noted, in connection with this drive for the rod 156, that the shaft 161 extends directly from front to rear of the machine, parallel with the line of feed, and is not disposed at an angle in the manner in which shaft 91 of Figs. 1 and 4 is mounted.

Figure 12:
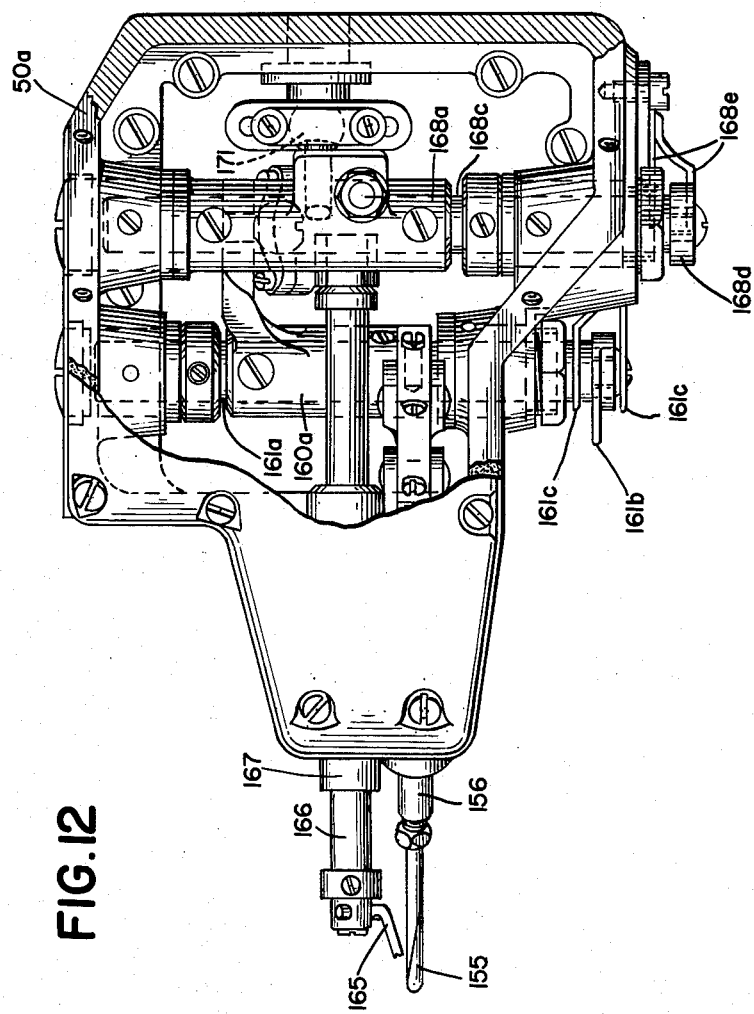
Fig. 12 is a view, partially in plan and partially in horizontal section, of a portion of the machine of Fig. 10.
Figure 13:
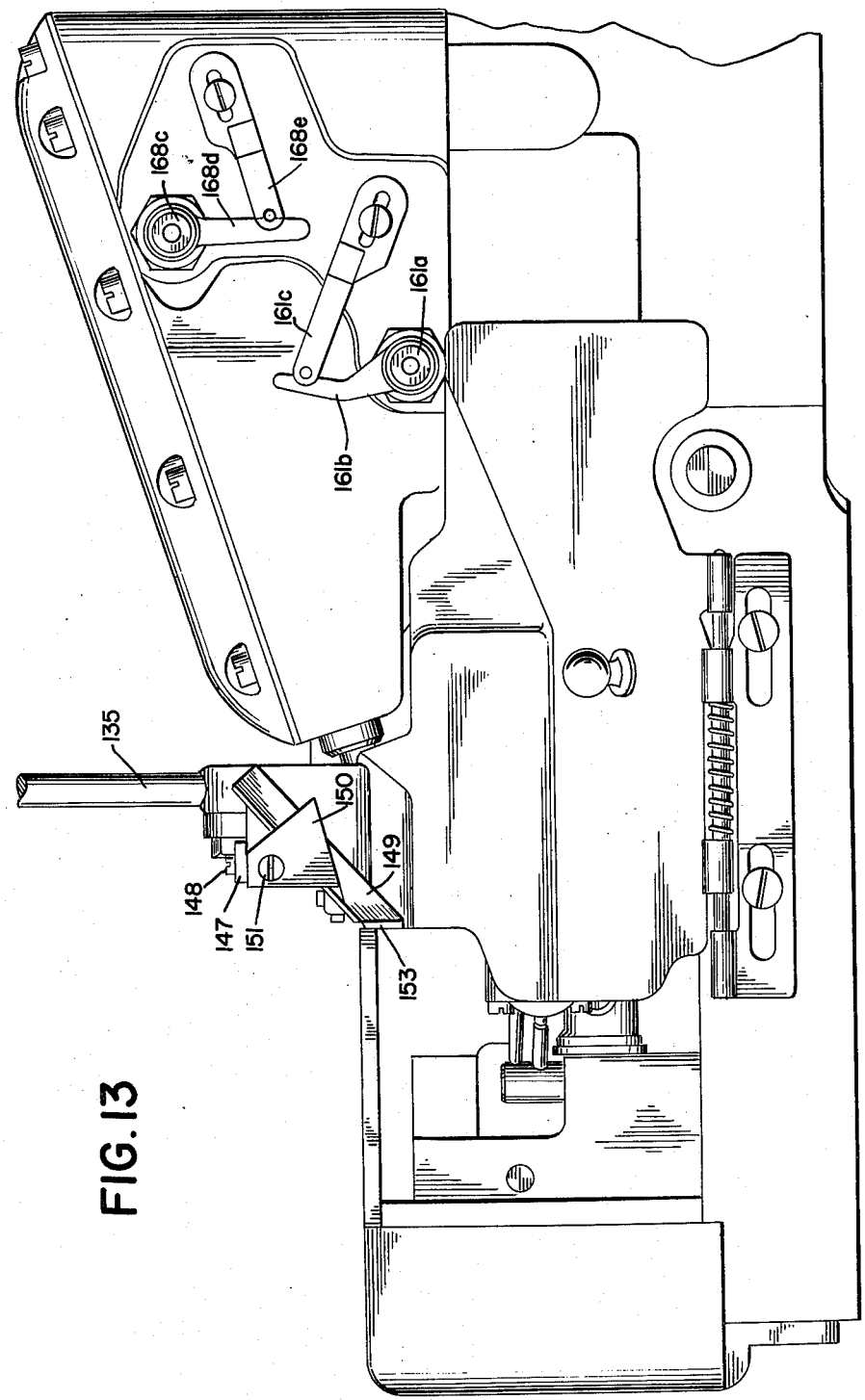
Fig. 13 is a front elevational view of a portion of the machine shown in Fig. 10.

In Figs. 12 and 13 a slightly modified arrangement of the rock member and its supporting shaft is shown. Here the supporting shaft 161a for the rock member 160a is mounted for rocking movement in bearings provided in the hood 50a. The shaft 161a extends through the front wall of the hood and carries a take-up arm 161b adjacent its outer end arranged to cooperate with thread for the underlooper passing between eyes in a pair of spaced guide arms 161c adjustably secured to the outer face of the hood. Rock member 160a is secured to the shaft 161a and imparts its rocking movements to the latter.

Figure 10:
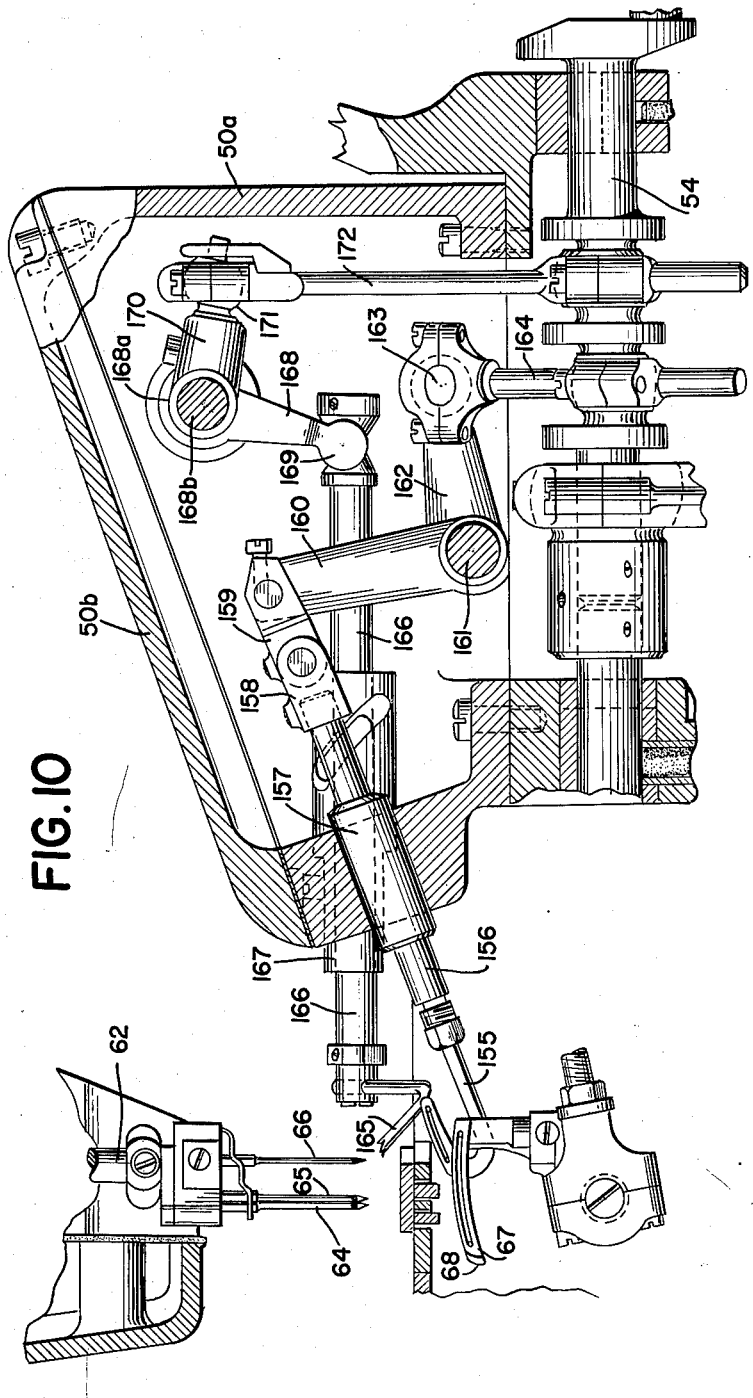
Fig. 10 is an enlarged vertical, longitudinal, sectional view through a portion of a modified form of machine, which is generally similar to the machine shown in Figs. 1 to 9 inclusive, but embodies certain changes.
Figure 11:
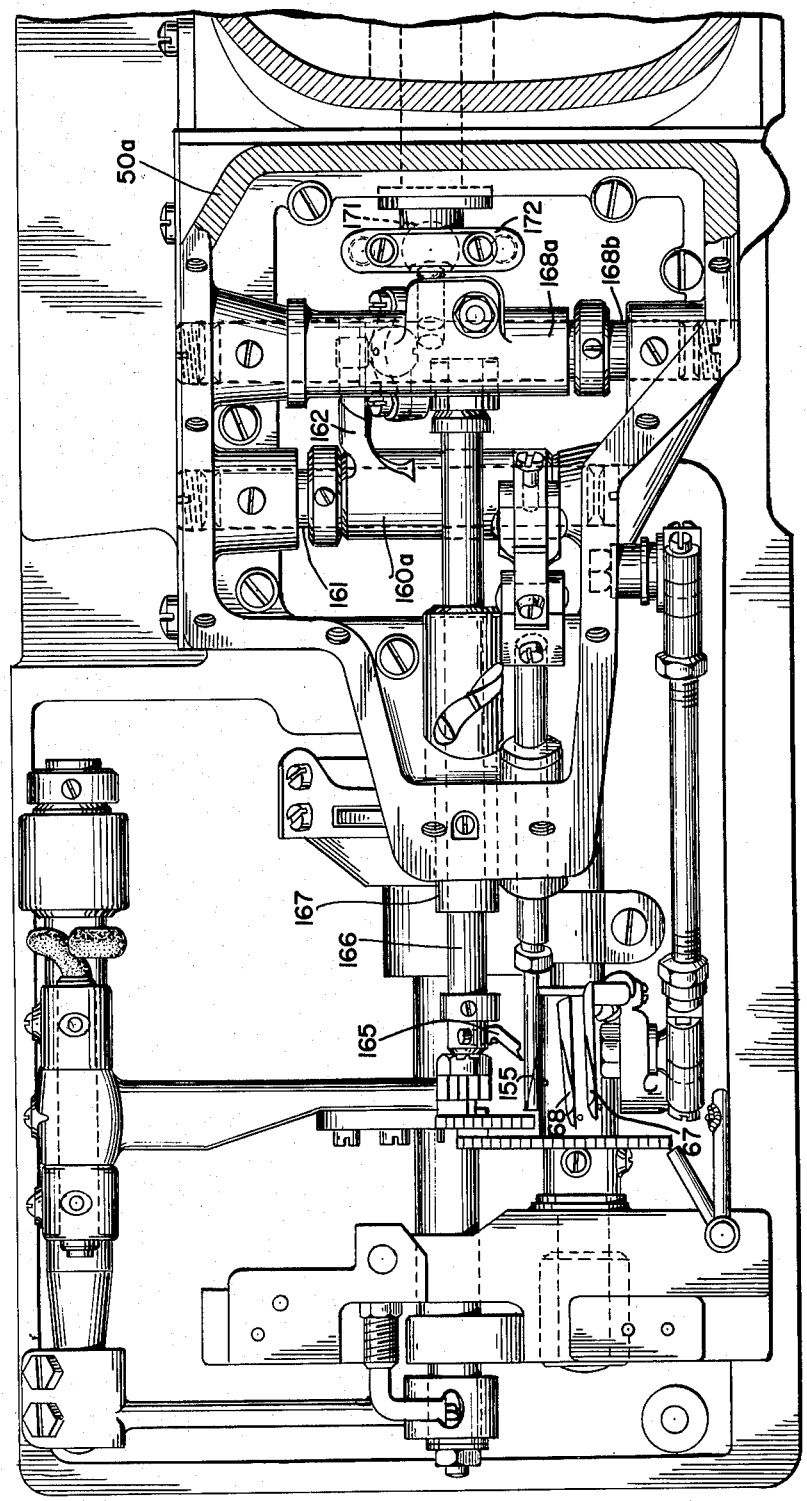
Fig. 11 is a view, partially in plan and partially in horizontal section, of a portion of the modified machine of Fig. 10.

Cooperating with the looper 155 adjacent the edge of the work and with the needle 66 above the work is an overedge element 165 which may either be of the spreader type or a thread carrying looper. In Fig. 10 a spreader is illustrated. This is carried by a rod 166 arranged for axial reciprocation and for oscillation about its axis to carry the thread engaging end of the member back and forth along a spiral path to cooperate with the looper 155 and needle 66 in the manner explained. Rod 166 is journalled for sliding and oscillatory movement in a bearing sleeve 167. The axis of the rod is disposed at a suitable distance above the work supporting surface, this being somewhat higher than the axis of the rod 97 (Fig. 1). The arrangement is such that in the reciprocatory and oscillatory movement of the element 165 it will cooperate properly with the looper 155 and the needle 66. To impart the reciprocatory and oscillatory movement to the rod 166 devices similar to those disclosed in Fig. 1 are provided. They include a downwardly extending arm 168 of a member 168a rockably mounted on a fixed shaft 168b. Arm 168 has a forked lower end arranged to straddle a reduced portion of the rod 166 and provided with cylindrical end portions 169 arranged to cooperate with washers mounted for slight vertical movement on the rod and provided with faces of cylindrical contour cooperating with the end portions 169. Connected with the rock member 168a is a laterally extending arm 170 carrying a ball pin 171 that is received by a strap at the upper end of a pitman 172. The lower end of this pitman cooperates with a spherical eccentric or crank on the shaft 54. To accommodate the modified construction in which the axis of the rod 166 is disposed some distance above the work support, the hood or housing 50a (Fig. 10) is made somewhat higher than the corresponding hood of Fig. 1. In respects other than those mentioned, the modified construction is the same as for the machine first described.

In Figs. 12 and 13 a slightly modified arrangement is shown, in which the rock member 168a is secured to a shaft 168c rockably mounted in bearings carried by the hood 50a. The shaft 168c extends outwardly through the front wall of the hood and carries a take up arm 168d which is arranged to engage thread retained by eyes formed in two spaced guide arms 168e adjustably mounted on the front of the hood. The thread so engaged may be the overedge looper thread in a machine adapted to produce a 504 type stitch.

Figure 14:
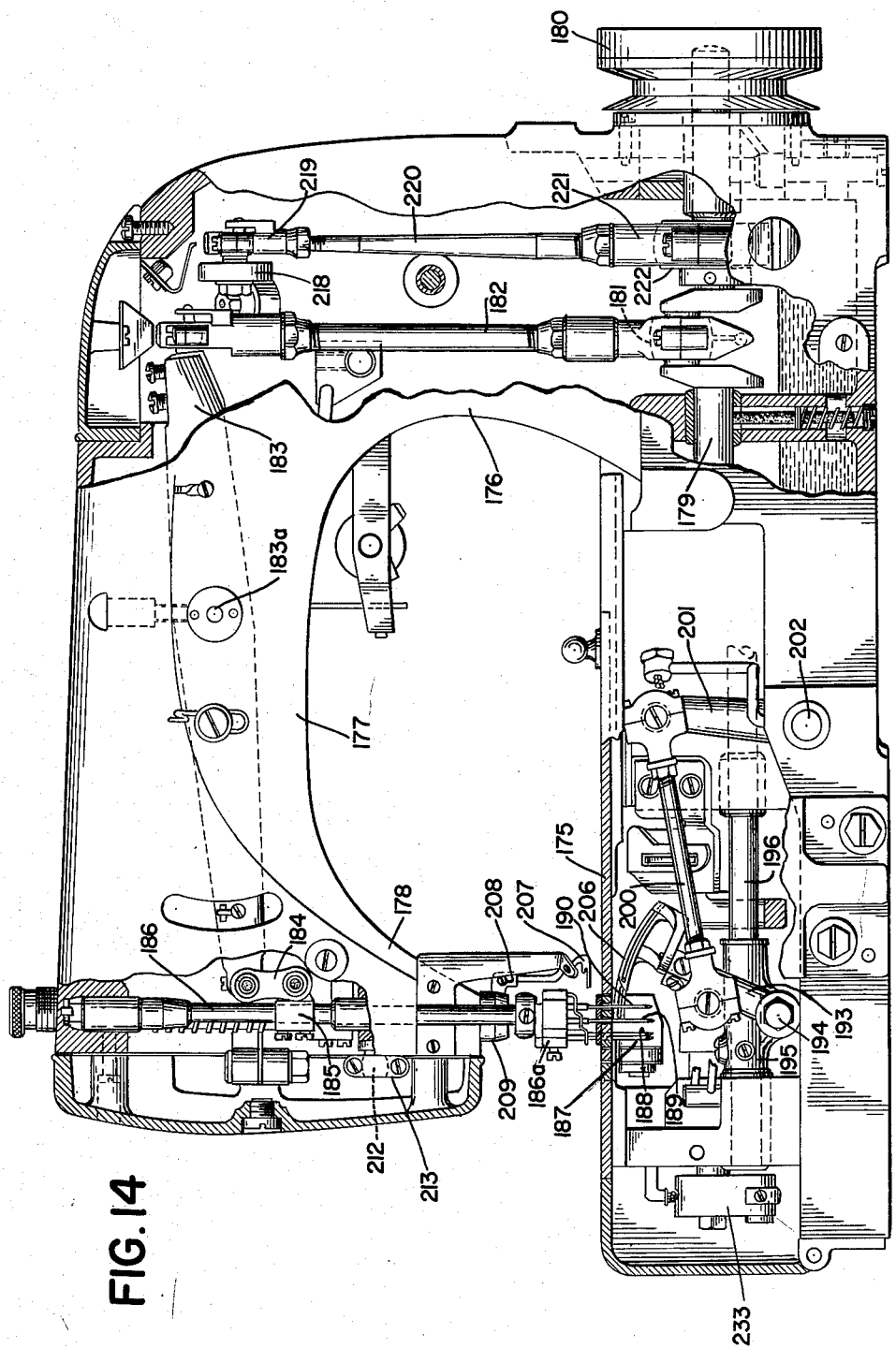
Fig. 14 is a view, partially in elevation and partially in longitudinal section, showing a further modified form of machine constructed and arranged to produce a seam embodying two lines of 401 type stitching and a 602 type line of stitching.

Turning now to Figs. 14 to 21 inclusive, there is illustrated a machine adapted to produce, at high speed, seams of the type illustrated in Figs. 24 and 25. It will be understood that in producing a seam of the type shown in Fig. 25, the overedge stitching 38, 39 will first be applied to the work section 36 on a simple overedge sewing machine of any suitable type. The two sections will then be fed in superposed relation through the new machine to provide simultaneously the remaining lines of stitches. This new machine has a main frame provided with a work supporting base portion 175, a vertical standard 176, an overhanging arm 177, and a needle head 178 carried by the outer end of the overhanging arm. A main drive shaft 179 is suitably journalled in the base portion of the machine and carries a combined handwheel and pulley 180 at its outer end which extends beyond the frame at the right end of the machine (Fig. 14). A spherical crank 181 carried by the shaft 179 cooperates with the spherical seat of a strap at the lower end of a pitman 182. At its upper end the pitman 182 is provided with a spherical strap which receives a ball pin projecting from a needle lever 183 rockably mounted on a pivot 183a in the overhanging arm. The opposite end of the needle lever extends into the needle head and is there connected by a link 184 with a block 185 secured to a needle bar 186 mounted for vertical reciprocation in the needle head. At its lower end the needle bar carries a needle holder 186a arranged to receive four needles 187, 188, 189 and 190. The needles 187 and 188 cooperate with loopers 191 and 192 to form two closely adjacent lines of 401 stitches. The construction and arrangement of the parts for accomplishing this is the same as described in relation to Fig. 1. The two loopers mentioned are carried by an arm 193 pivotally mounted on a bolt 194 extending forwardly from a sleeve 195 secured to a rock shaft 196. The latter, as best shown in Fig. 19, has secured thereto a downwardly and rearwardly extending arm 197 which is pivotally connected with the lower end of a pitman 198 cooperating with an eccentric 199 secured to the drive shaft 179. Rocking movements are thus imparted to the shaft 196 to provide the desired needle avoid movements of the loopers.

Loop seizing and shedding movements are imparted to the loopers by means of a connecting rod 200 connected at one end with the arm 193 and at its other end with an arm 201 secured to a shaft 202. The latter extends from a point outside of an enclosed portion of the frame at the front of the machine to a point within the enclosed portion of the frame at which it has secured thereto an arm 203 (Fig. 20). This arm carries a ball pin at its outer end which is received by a strap at the lower end of a pitman 204, the upper end of which cooperates with a spherical eccentric 205 secured to the shaft 179.

Also mounted on the looper carrying arm 193 is a third looper 206 which cooperates with both of the needles 189 and 190 in forming a 602 line of stitches over the edge of the work. The needles 189 and 190 are disposed in the same vertical plane transverse to the line of feed of the machine. The timing of the various movements of the needles and the looper 206 is such as to interlock the needle thread loops and the loopers thread loops in the manner illustrated in Figs. 24 and 25.

Figure 16:
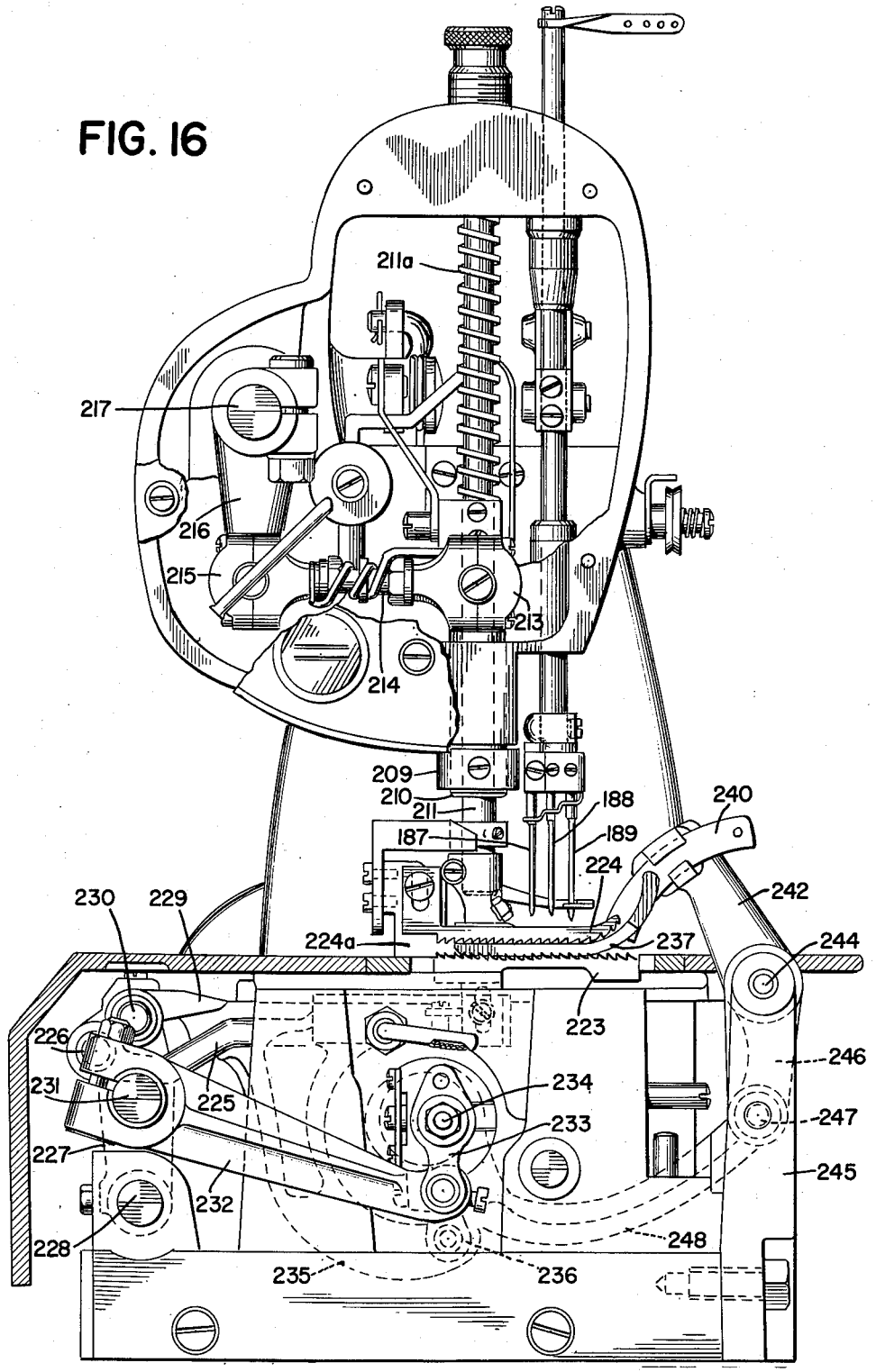
Fig. 16 is a view, partly in end elevation as seen from the left in Fig. 14 and partly in section, of the machine illustrated in Fig. 14, certain cover elements being broken away to reveal the interior mechanism of the machine.

Above the work support a cover thread laying finger 207 is provided to incorporate in the line of stitching the cover thread indicated at 34 in Fig. 24. This cover thread laying finger is retained by a screw 208 in a downwardly facing socket extending from a collar 209 secured to the lower end of a sleeve 210 (Fig. 16). This sleeve surrounds and is oscillatable about a presser bar 211. The sleeve is journalled in a bushing carried by the bottom portion of the needle head. Adjacent its upper end the sleeve 210 is provided with a laterally extending ball pin 212 which is received by a strap 213 at the forward end of a pitman 214. The rear end of this pitman has a strap 215 cooperating with a ball pin extending laterally from an arm 216 secured to a rock shaft 217. This rock shaft extends along the rear face of the overhanging arm of the frame in the same manner as the shaft 129 of Fig. 5. Within the rearward extension of the vertical standard of the frame (similar to the extension 130 of Fig. 5) there is secured to the shaft 217 an arm 218 (Fig. 14) provided with a laterally extending ball pin received by a strap 219 at the upper end of a pitman 220. The lower end of this pitman has a strap 221 cooperating with a spherical eccentric 222 carried by the drive shaft 179. Through the connections described, the sleeve 210 which carries the cover thread laying finger 207 will be oscillated in properly timed relation to the reciprocation of the needles to incorporate the cover thread in the line of stitches in the manner shown in Fig. 24.

The work feeding mechanism illustrated, for the purpose of advancing the work in relation to the stitch forming devices, is of the character more fully disclosed in the application of Robert A. Hayes, Serial No. 390,509, filed November 6, 1953, now Patent No. 2,811,123, granted October 29, 1957. Reference may be had to that application for a fuller disclosure of the mechanism. It involves an under feed dog 233 and a top feed dog 224 (Fig. 16). The under feed dog is carried by a feed bar 225 pivotally mounted by a rod 226 on a feed rocker 227. The latter is carried by a rock shaft 228 suitably journalled in the base of the frame. The top feed dog 224 is carried by a post 224a which extends upwardly through the cloth plate of the machine and has its lower end mounted on a feed bar 229 which is pivotally connected with the feed rocker 227 by means of a pivot pin 230. Rocking movements are imparted to the feed rocker by means of an arm 232 which is clamped upon a laterally extending projection 231 of the feed rocker. The arm 232 extends forwardly and downwardly toward the front of the machine and at its forward end is pivotally connected with a pitman 233 having a strap which cooperates with an adjustable eccentric element 234 mounted on the shaft 179 adjacent its left end (Fig. 14). Feed bar 225 has a downwardly and forwardly extending arm 235 which is pivotally connected with the lower end of a pitman 236 having a strap at its upper end cooperating with an eccentric (not shown) on the shaft 179. It will be understood that feed and return movements are imparted to the feed dog by the adjustable eccentric element 234, while lifting and lowering movements are imparted to the under feed dog by the eccentric cooperating with the pitman 236. Feed and return movements are also imparted to the top feed dog 224 by the rocking of the feed rocker 227 through the operation of the adjustable eccentric element 234. Lifting and lowering movements are imparted to the top feed dog by connections similar to those described in relation to the under feed dog but arranged for operation by a different eccentric on the shaft 179. The arrangement is such that as the under feed dog is shifted upwardly the top feed dog will be moved downwardly. As more fully explained in said Hayes application, a yielding connection, comprising a spring 229a, is provided between the feed bar 229 and the arm which is acted upon by the eccentric that imparts lifting and lowering movements to the top feed dog. For retaining work against the throat plate and in proper cooperation with the under feed dog, a presser foot 237 is mounted on the presser bar 211 and is yieldingly urged downwardly by a spring 211a surrounding the presser bar.

Figure 15:
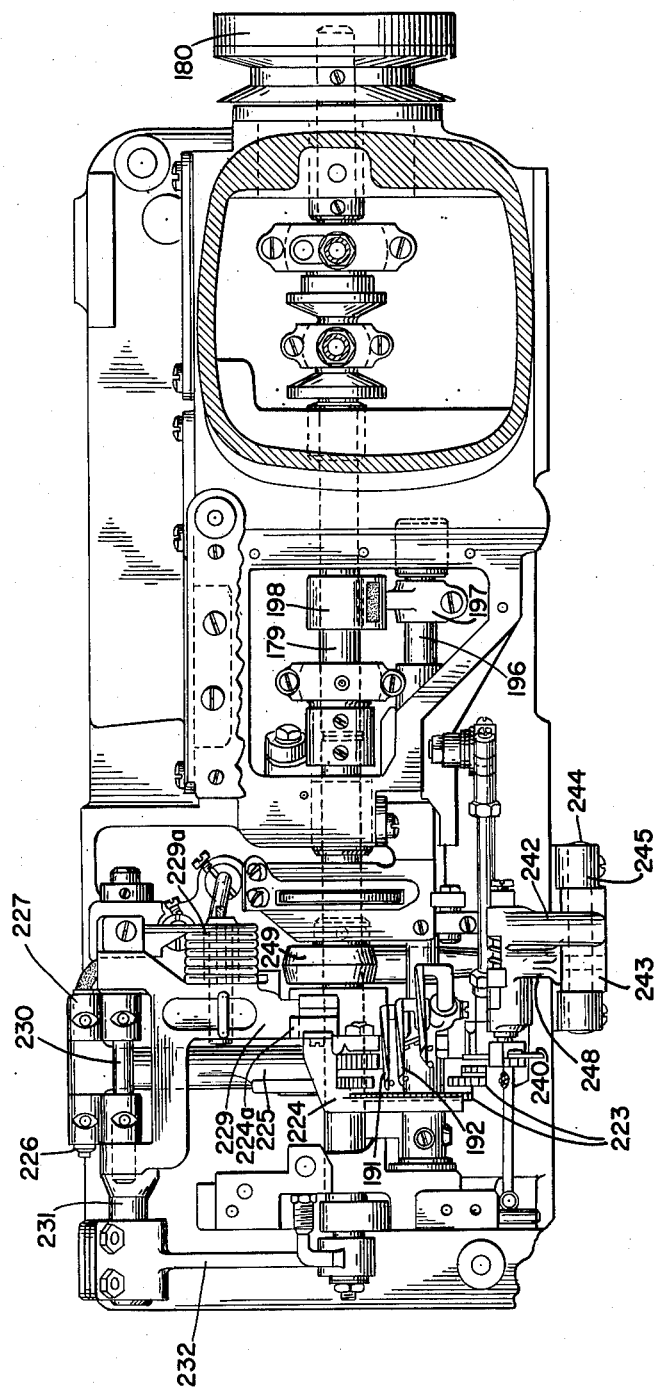
Fig. 15 is a view, partially in plan and partially in horizontal section, showing the base portion of the machine shown in Fig. 14.

Edge trimming means is provided to trim the edge or edges of the work a short distance in advance of the needle 190 and along a line, parallel with the line of feed, just to the left of that needle (Fig. 15). As best shown in Fig. 21, the edge trimming blades are mounted adjacent an edge of the throat plate 238 and are so disposed as to trim the edge of the work along the line indicated. The trimmer comprises a stationary blade 239 suitably mounted on the base of the frame, and a movable blade 240 which has a portion constantly engaged with the right side face of the stationary blade. An inclined cutting edge 241 is provided on the movable blade to cooperate with the cutting edge of the stationary blade. The construction and operation of the trimmer mechanism disclosed is as more fully shown and described in the patent to Kucera, No. 2,121,526, granted June 21, 1938. Briefly, it comprises a yieldable mounting of the blade 240 on a rock arm 242, the blade being urged laterally under suitable spring pressure to retain it in firm cutting relation to the stationary blade. Rock arm 242 projects from a sleeve 243 rockably mounted on a rod or shaft 244 carried by spaced supporting arms of a bracket 245 secured to the front of the base portion of the machine. A downwardly extending arm 246, also integral with the sleeve 243, is pivotally connected by a pin 247 with the forward end of a pitman 248. The latter at its opposite end has a strap 249 (Fig. 15) arranged to cooperate with an eccentric on the shaft 179.

The coordinated operation of the stitch forming elements, work feeding devices, and edge trimming mechanism will be clear from the foregoing detailed description. In the course of repeated operations of the various instrumentalities a seam of the character shown in Fig. 24 will be produced.

It will be understood that the machine is provided with suitable thread handling and take-up devices to control the various threads in the formation of the several lines of stitching. Such thread control means may be of the general character illustrated in the patent to Thompson et al., No. 2,107,918, granted February 8, 1938. So also, suitable presser bar lifting means are incorporated in the machine to facilitate the introduction of work. Means are also provided for properly lubricating all of the wear receiving parts of the mechanism of the machine. Since these features form no part of the invention to be claimed herein it is believed unnecessary to describe them further.

While various new seams produced in accordance with the invention and several embodiments of a machine adapted to produce the new seams have been described in considerable detail, it will be understood that various further modifications may be made within the scope of the appended claims.

What is claimed is:

1. A sewing machine for producing a seam having a plurality of lines of stitching which comprises work feeding means for advancing a plurality of sections of work in a predetermined direction, a reciprocable needle bar carrying a plurality of needles, an oscillatable looper cooperating with each of said needles to form a line of two-thread chain stitches parallel with the direction of feed, said needles and loopers being arranged to produce a plurality of closely spaced lines of stitching in staggered relation to each other, a further needle carried by said needle bar, a bodily reciprocable thread-carrying looper cooperating with said further needle, and a reciprocatory and oscillatory stitch forming element cooperating with said last mentioned looper to form overedge stitches, said element having a horizontally disposed axis which is at an acute angle to the vertical plane containing the axis of said bodily reciprocable looper and having a thread engaging portion carried during its reciprocation and oscillation from a point adjacent said axis of said looper to a point adjacent the path of said further needle in the course of forming said overedge stitches.

2. A sewing machine for producing a seam having a plurality of lines of stitching which comprises work feeding means for advancing a plurality of sections of work in a predetermined direction, a reciprocable needle bar carrying a plurality of needles, an oscillatable looper cooperating with each of said needles to form a line of two-thread chain stitches parallel with the direction of feed, said needles and loopers being arranged to produce a plurality of closely spaced lines of stitching in staggered relation to each other, a further needle carried by said needle bar, a bodily reciprocable thread-carrying looper cooperating with said further needle, and a reciprocatory and oscillatory stitch forming element cooperating with said last mentioned looper to form overedge stitches, said element having a horizontally disposed axis which is in a vertical plane parallel with the vertical plane containing the axis of said bodily reciprocable looper.

3. A sewing machine for producing a seam having a plurality of lines of stitching which comprises work feeding means for advancing a plurality of sections of work in a predetermined direction, a reciprocable needle bar carrying a plurality of needles, an oscillatable looper cooperating with each of said needles to form a line of two-thread chain stitches parallel with the direction of feed, said needles and loopers being arranged to produce a plurality of closely spaced lines of stitching in staggered relation to each other, a further needle carried by said needle bar, a bodily reciprocable thread-carrying looper cooperating with said further needle, and a reciprocatory and oscillatory switch forming element cooperating with said last mentioned looper to form overedge stitches, said element having a horizontally disposed axis which is in a vertical plane parallel with the vertical plane containing the axis of said bodily reciprocable looper, the axis of said element being so positioned in relation to the path of said further needle and to the path of the thread carrying portion of said looper that the active end of said element is carried during its reciprocation and oscillation from a point adjacent said path of said thread carrying portion of the looper to a point adjacent said path of said further needle in the course of forming said overedge stitches.

4. A sewing machine for producing a seam having a plurality of lines of stitching which comprises work feeding means for advancing a plurality of sections of work in a predetermined direction, a reciprocable needle bar carrying a plurality of needles, an oscillatable looper cooperating with each of said needles to form a line of two-thread chain stitches parallel with the direction of feed, said needles and loopers being arranged to produce a plurality of closely spaced lines of stitching in staggered relation to each other, a further needle carried by said needle bar, a bodily reciprocable thread-carrying looper cooperating with said further needle, and a reciprocatory and oscillatory stitch forming element cooperating with said last mentioned looper to form overedge stitches, said element having a horizontally disposed axis which is so disposed in relation to the path of said further needle and to the path of the thread carrying portion of said looper that said element is carried during its reciprocation and oscillation from a point adjacent said axis of said looper to a point adjacent the path of the further needle in the course of forming said overedge stitches.

5. A sewing machine which comprises a frame having a horizontally disposed work supporting surface, work feeding means for advancing work in a predetermined direction over said surface, a vertically reciprocable needle bar carrying a plurality of needles having thread receiving eyes, said needles being reciprocated by said needle bar to carry the eyes thereof from a point above said surface to a point below the same, a plurality of loopers cooperating with said needles below said surface to form a plurality of lines of two-thread chain stitches parallel with the direction of feed in closely adjacent relation, the arrangement of said needles and loopers being such as to form said stitches in said lines in staggered relation to each other, a further needle carried by said needle bar in substantially spaced relation to said plurality of needles, and means cooperating with said further needle to form an overedge line of stitching spaced from said lines of chain stitches, said last mentioned means comprising a looper cooperating with said further needle and reciprocable along an axis at an angle to said work supporting surface, and an overage element arranged for reciprocation along and oscillation about a horizontal axis, said element having a thread engaging portion which is carried upon reciprocation and oscillation of the element from a point adjacent the path of said looper to a point adjacent the path of said further needle in the formation of said overedge line of stitches.

6. A sewing machine which comprises a frame having a horizontally disposed work supporting surface, work feeding means for advancing work in a predetermined direction over said surface, a vertically reciprocable needle bar carrying a plurality of needles having thread receiving eyes, said needles being reciprocated by said needle bar to carry the eyes thereof from a point above said surface to a point below the same, a plurality of loopers cooperating with said needles below said surface to form a plurality of lines of two-thread chain stitches parallel with the direction of feed in closely adjacent relation, the arrangement of said needles and loopers being such as to form said stitches in said lines in staggered relation to each other, a further needle carried by said needle bar in substantially spaced relation to said plurality of needles, and means cooperating with said further needle to form an overedge line of stitching spaced from said lines of chain stitches, said last mentioned means comprising a looper cooperating with said further needle and reciprocable along an axis at an angle to said work supporting surface, and an overedge element arranged for reciprocation along and oscillation about a horizontal axis, said element having a thread engaging portion which is carried upon reciprocation and oscillation of the element from a point adjacent the path of said looper to a point adjacent the path of said further needle in the formation of said overedge line of stitches, the axis about which said element is reciprocated and oscillated being disposed in a vertical plane parallel with the plane containing the axis of said looper and at such an elevation above said work supporting surface as to carry said thread engaging portion of the element to said points.

7. A sewing machine which comprises a frame having a horizontally disposed work supporting surface, work feeding means for advancing work in a predetermined direction over said surface, a vertically reciprocable needle bar carrying a plurality of needles having thread receiving eyes, said needles being reciprocated by said needle bar to carry the eyes thereof from a point above said surface to a point below the same, a plurality of loopers cooperating with said needles below said surface to form a plurality of lines of two-thread chain stitches parallel with the direction of feed in closely adjacent relation, the arrangement of said needles and loopers being such as to form said stitches in said lines in staggered relation to each other, a further needle carried by said needle bar in substantially spaced relation to said plurality of needles, and means cooperating with said further needle to form an overedge line of stitching spaced from said lines of chain stitches, said last mentioned means comprising a looper cooperating with said further needle and reciprocable along an axis at an angle to said work supporting surface, and an overedge element arranged for reciprocation along and oscillation about a horizontal axis, said element having a thread engaging portion which is carried upon reciprocation and oscillation of the element from a point adjacent the path of said looper to a point adjacent the path of said further needle in the formation of said overedge line of stitches, the axis about which said element is reciprocated and oscillated being disposed in a horizontal plane closely adjacent to said work supporting surface and in a vertical plane at such an acute angle to the vertical plane containing the axis of said looper as to carry the thread engaging portion of said element to said points.

8. A sewing machine for producing a seam having a plurality of separate lines of stitching which comprises a single work feeding means for advancing a plurality of sections of work in a predetermined direction in relation to all stitch forming devices, a needle carrier movable back and forth along a predetermined path, a clamp secured to said needle carrier having mounted thereon a plurality of needles and a looper cooperating with each of said needles to form a line of two-thread chain stitches parallel with the direction of feed, said needles and loopers being arranged to produce a plurality of closely spaced lines of stitching in staggered relation to each other, at least one further needle carried by said clamp on said needle carrier and spaced from said first-mentioned needles in the direction of feed only a sufficient distance to provide space for cooperating stitch forming elements and spaced from said first-mentioned needles laterally to the right of the direction of feed, and means cooperating with said at least one further needle to form an overedge type of stitch spaced substantially from said first-mentioned lines of stitching at one side thereof.

9. A sewing machine of the character set forth in claim 8 in which all of the stitch forming devices are adapted to produce stitches of the same length in the direction of feed.

10. A sewing machine of the character set forth in claim 8 in which only one further needle is provided, said cooperating means comprising a thread carrying looper and a spreader arranged to produce a two-thread overedge stitch in coordination with said further needle.

11. A sewing machine of the character set forth in claim 8 in which only one further needle is provided, said cooperating means comprising two thread carrying loopers arranged to produce a three-thread overedge stitch in coordination with said further needle.

12. A sewing machine of the character set forth in claim 8 in which there are two of said further needles, said cooperating means comprising a plurality of thread carrying members arranged to produce said overedge line of stitching in coordination with said further needles.

13. A sewing machine of the character set forth in claim 12 having a frame provided with a horizontally disposed work supporting surface, said needle carrier being a reciprocable needle bar, said bar carrying said plurality of needles and said further needles, said needles all having thread receiving eyes which are carried from a point above said surface to a point below the same, said cooperating means cooperating with said further needles in part above and in part below said work supporting surface to produce said line of overedge stitching.

14. In a sewing machine, means feeding the superposed edge portion of a plurality of pieces of fabric through a stitching station; three needles located at the stitching station and disposed in laterally spaced relation and also offset in relation to each other in the direction of the line of feed to stitch through the superposed edge portion, one pair of the needles being adapted to stitch the superposed edge portion inwardly of said edge thereof and the third needle being adapted to form stitches at the edge; means for actuating said needles; looper mechanism cooperating with said pair of needles to secure the pieces of fabric together with longitudinally offset stitches; secondary looper mechanism cooperating with the third needle located adjacent the edge of the fabric to form a separate binding stitch extending around the superposed edges of the fabric and displaced longitudinally from said other stitches; and a common drive means for the means for actuating the needles and said looper mechanism.

15. In a sewing machine, a main shaft, means feeding the superposed edge portion of a plurality of pieces of fabric through a stitching station; three needles located at the stitching station and disposed in laterally spaced relation and longitudinally offset in relation to each other in the direction of the line of feed to stitch through the superposed edge portion, one pair of the needles being adapted to stitch the superposed edge portion inwardly of said edge and the third needle being adapted to form stitches at the edge; means for actuating said needles; looper mechanism cooperating with said pair of needles to secure the pieces of fabric together with longitudinally offset stitches; secondary looper mechanism cooperating with the third needle located adjacent the edge of the fabric; and means for actuating the needles and said looper to form an independent binding stitch extending around the superposed edges of the fabric; and means for driving said mechanisms in predetermined timed relation from said main shaft.

16. In a sewing machine, means feeding the superposed edge portion of a plurality of pieces of fabric through a stitching station; three needles located at the stitching station and disposed in laterally spaced relation and longitudinally offset diagonally in the direction of the line of feed to stitch through the superposed edge portion, one pair of the needles being adapted to stitch the superposed edge portion inwardly of said edge thereof and the third needle being adapted to form stitches at the edge; means for actuating said needles; looper mechanism cooperating with said pair of needles to secure the pieces of fabric together with longitudinally offset stitches; secondary looper mechanism cooperating with the third needle located adjacent the edge of the fabric to form a separate binding stitch extending around the superposed edges of the fabric and displaced longitudinally from said other stitches; and a common drive means for the means for actuating the needles and said looper mechanism.

17. In a sewing machine, a main shaft, means feeding the superposed edge portion of a plurality of pieces of fabric through a stitching station; three needles located at the stitching station and disposed in laterally spaced relation and longitudinally offset diagonally in the direction of the line of feed to stitch through the superposed edge portion, one pair of the needles being adapted to stitch the superposed edge portion inwardly of said edge and the third needle being adapted to form stitches at the edge; means for actuating said needles; looper mechanism cooperating with said pair of needles to secure the pieces of fabric together with longitudinally offset stitches; secondary looper mechanism cooperating with the third needle located adjacent the edge of the fabric the means for actuating the needles and said looper to form an independent binding stitch extending around the superposed edges of the fabric; and means for driving mechanisms in predetermined timed relation from said main shaft.

References Cited in the file of this patent

UNITED STATES PATENTS

| | | |
|---|---|---|
| 904,854 | English | Nov. 24, 1908 |
| 1,221,253 | Weis | Apr. 3, 1917 |
| 1,528,499 | Moffatt | Mar. 3, 1925 |
| 1,587,957 | Huber | June 8, 1926 |
| 1,736,453 | Maier | Nov. 19, 1929 |
| 1,768,103 | Berger | June 24, 1930 |
| 1,949,073 | Gruman et al. | Feb. 27, 1934 |
| 2,157,373 | Weis | May 9, 1939 |
| 2,248,907 | Lutz | July 8, 1941 |
| 2,439,332 | Becker | Apr. 6, 1948 |